US012711400B2

(12) United States Patent
Rahman et al.

(10) Patent No.: US 12,711,400 B2
(45) Date of Patent: Aug. 18, 2026

(54) SYSTEM, METHOD, AND COMPUTER PROGRAM PRODUCT FOR TESTING A MACHINE LEARNING MODEL BASED ON SIMULATIONS IN AN OFFLINE ENVIRONMENT

(71) Applicant: Visa International Service Association, San Francisco, CA (US)

(72) Inventors: Md Sharifur Rahman, Leander, TX (US); Yinhe Cheng, Austin, TX (US); Feng Chen, Cedar Park, TX (US); Yu Gu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 965 days.

(21) Appl. No.: 17/959,398

(22) Filed: Oct. 4, 2022

(65) Prior Publication Data

US 2024/0112046 A1 Apr. 4, 2024

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
USPC ............................................................ 706/12
See application file for complete search history.

(56) References Cited

U.S. PATENT DOCUMENTS

| | | | | |
|---|---|---|---|---|
| 11,494,835 | B2 * | 11/2022 | Harris | G06N 5/02 |
| 2004/0009462 | A1 * | 1/2004 | McElwrath | G09B 7/02 434/350 |
| 2012/0271748 | A1 * | 10/2012 | DiSalvo | G06Q 40/04 705/37 |
| 2018/0318719 | A1 * | 11/2018 | Ma | G06N 3/09 |
| 2019/0004920 | A1 * | 1/2019 | Vandriessche | G06F 30/3312 |
| 2020/0012902 | A1 * | 1/2020 | Walters | H04L 63/1416 |
| 2020/0118137 | A1 * | 4/2020 | Sood | G06Q 10/00 |
| 2021/0174449 | A1 * | 6/2021 | Thomas | G06F 18/2148 |
| 2021/0192361 | A1 * | 6/2021 | Mumme | G06N 20/20 |
| 2021/0295613 | A1 * | 9/2021 | Feng | G01M 17/06 |
| 2021/0406796 | A1 * | 12/2021 | Liu | G06N 20/00 |
| 2021/0406896 | A1 * | 12/2021 | Chaturvedi | G06Q 20/405 |
| 2022/0382936 | A1 * | 12/2022 | Xie | G06F 11/3696 |

* cited by examiner

*Primary Examiner* — Leron Beck
(74) *Attorney, Agent, or Firm* — The Webb Law Firm

(57) ABSTRACT

Provided is a system for testing a machine learning (ML) model based on simulations in an offline environment that includes at least one processor programmed or configured to receive historical transaction data, generate online simulation data, wherein generating the online simulation data includes modifying the historical timestamp of each data record to provide online simulation data. The processor is further programmed or configured to determine a timeline for a plurality of data insertion actions and a plurality of data request actions based on the online simulation data, perform a simulation of online activities involving a stateful ML model using the timeline for the plurality of data insertion actions and the plurality of data request actions, and validate the stateful ML model based on the simulation of online activities. Methods and computer program products are also provided.

17 Claims, 8 Drawing Sheets

400

| Historical Data | |
|---|---|
| Timestamp | Transaction Data Entry |
| 06:24:13 | Transaction Data 1 |
| 06:36:45 | Transaction Data 2 |
| 09:22:07 | Transaction Data 3 |
| . . | . . |
| hh:mm:ss | Transaction Data n |

| Simulation Data | |
|---|---|
| Timestamp | Transaction Data Entry |
| 00:00:00 | Transaction Data 1 |
| 00:12:32 | Transaction Data 2 |
| 02:57:54 | Transaction Data 3 |
| . . | . . |
| hh:mm:ss | Transaction Data n |

410
Generate simulation data

Machine Learning Model Testing System
102

SYSTEM, METHOD, AND COMPUTER PROGRAM PRODUCT FOR TESTING A MACHINE LEARNING MODEL BASED ON SIMULATIONS IN AN OFFLINE ENVIRONMENT

BACKGROUND

1. Field

The present disclosure relates generally to systems, devices, products, apparatus, and methods for live testing a machine learning (ML) model and, in one particular embodiment, to a system, method, and computer program product for live testing the ML model based on simulations in an offline environment using offline data.

2. Technical Considerations

Machine learning may refer to a field of computer science that uses statistical techniques to provide a computer system with the ability to learn (e.g., to progressively improve performance of) a task with data without the computer system being explicitly programmed to perform the task. In some instances, a machine learning (ML) model may be developed for a set of data so that the ML model may perform a task (e.g., a task associated with a prediction) with regard to the set of data.

Feature engineering may refer to a process of using domain knowledge to extract features (e.g., characteristics, properties, attributes, etc.) from raw data that are to be used for producing the ML model. The motivation is to use the features that were extracted from the raw data to improve the quality of results of a machine learning process, such as a supervised learning process, compared with supplying only the raw data to the ML model during a machine learning process.

However, feature engineering for the ML model may require multiple steps with data sources of different availability based on time. Unit testing of data sources component by component alone may not be able to guarantee a correct result for feature engineering due to the timeline of data availability. Further, historical offline data cannot be used directly as online data sources since the content of the historical offline data may be different from online data, for example, based on data encryption aspects of the historical offline data. Additionally, replaying of data with old timestamps may not be possible.

A universal timeline may be an option for the issue of data sources having different timelines of data availability. However, a universal timeline is difficult to establish and to automate when testing across multiple data sources, as this may require manual breakpoints for data generation and/or insertion of data. The limitations of a universal timeline makes testing unscalable for large datasets and may not allow for generalization of data sources for different ML models and/or simulating different disturbance scenarios for a production environment.

SUMMARY

Accordingly, systems, devices, products, apparatus, and/or methods for live testing a machine learning (ML) model based on simulations in an offline environment using offline data are disclosed that overcome some or all of the deficiencies of the prior art.

According to non-limiting embodiments or aspects, provided is a system including at least one processor programmed or configured to receive historical transaction data. The historical transaction data may include a plurality of data records of history payment transactions. Each data record may have a historical timestamp. The at least one processor may be further programmed or configured to generate online simulation data. When generating the online simulation data, the at least one processor may be programmed or configured to modify the historical timestamp of each data record to provide online simulation data. The at least one processor may be further programmed or configured to determine a timeline for a plurality of data insertion actions and a plurality of data request actions based on the online simulation data. The at least one processor may be further programmed or configured to perform a simulation of online activities involving a stateful machine learning (ML) model using the timeline for the plurality of data insertion actions and the plurality of data request actions. The at least one processor may be further programmed or configured to validate the stateful ML model based on the simulation of online activities.

According to non-limiting embodiments or aspects, provided is a computer-implemented method including receiving historical transaction data. The historical transaction data may include a plurality of data records of history payment transactions. Each data record may have a historical timestamp. The may further include generating online simulation data. When generating the online simulation data, the method may include modifying the historical timestamp of each data record to provide online simulation data. The method may further include determining a timeline for a plurality of data insertion actions and a plurality of data request actions based on the online simulation data. The method may further include performing a simulation of online activities involving a stateful ML model using the timeline for the plurality of data insertion actions and the plurality of data request actions. The method may further include validating the stateful ML model based on the simulation of online activities.

According to non-limiting embodiments or aspects, provided is a computer program product including at least one non-transitory computer-readable medium including one or more instructions that, when executed by at least one processor, cause the at least one processor to receive historical transaction data. The historical transaction data may include a plurality of data records of history payment transactions. Each data record has a historical timestamp. The one or more instructions may further cause the at least one processor to generate online simulation data. The one or more instructions that cause the at least one processor to generate the online simulation data may cause the at least one processor to modify the historical timestamp of each data record to provide online simulation data. The one or more instructions may further cause the at least one processor to determine a timeline for a plurality of data insertion actions and a plurality of data request actions based on the online simulation data. The one or more instructions may further cause the at least one processor to perform a simulation of online activities involving a stateful ML model using the timeline for the plurality of data insertion actions and the plurality of data request actions. The one or more instructions may further cause the at least one processor to validate the stateful ML model based on the simulation of online activities.

Other non-limiting embodiments will be set forth in the following numbered clauses:

Clause 1: A system comprising at least one processor programmed or configured to: receive historical transaction data, wherein the historical transaction data comprises a plurality of data records of history payment transactions, wherein each data record has a historical timestamp; generate online simulation data, wherein, when generating the online simulation data, the at least one processor is programmed or configured to: modify the historical timestamp of each data record to provide online simulation data; determine a timeline for a plurality of data insertion actions and a plurality of data request actions based on the online simulation data; perform a simulation of online activities involving a stateful machine learning (ML) model using the timeline for the plurality of data insertion actions and the plurality of data request actions; and validate the stateful ML model based on the simulation of online activities.

Clause 2: The system of clause 1, wherein, when performing the simulation of online activities involving the stateful ML model, the at least one processor is programmed or configured to: perform a feature engineering procedure based on the online simulation data to provide a plurality of features for the simulation of online activities; and validate the plurality of features for the simulation of online activities based on the historical transaction data.

Clause 3: The system of clause 1 or 2, wherein the at least one processor is further programmed or configured to: perform a feature engineering procedure based on the historical transaction data to provide a plurality of features for the historical transaction data; and wherein, when validating the plurality of features for the simulation of online activities, the at least one processor is programmed or configured to: compare the plurality of features for the simulation of online activities to the plurality of features for the historical transaction data.

Clause 4: The system of any of clauses 1-3, wherein the at least one processor is further programmed or configured to: update a state of the stateful ML model after each data request action of the plurality of data request actions during the simulation of online activities.

Clause 5: The system of any of clauses 1-4, wherein, when generating the online simulation data, the at least one processor is programmed or configured to: perform one or more data conversion operations on the historical transaction data.

Clause 6: The system of any of clauses 1-5, wherein, when modifying the historical timestamp of each data record, the at least one processor is programmed or configured to: replace the historical timestamp of each data record with a relative timestamp.

Clause 7: The system of any of clauses 1-6, wherein, when performing the simulation of online activities involving the stateful ML model, the at least one processor is programmed or configured to: generate a simulation score of the stateful ML model based on the online simulation data; and wherein, when validating the stateful ML model, the at least one processor is programmed or configured to: compare the simulation score of the stateful ML model to a predetermined score.

Clause 8: A computer-implemented method comprising: receiving, with at least one processor, historical transaction data, wherein the historical transaction data comprises a plurality of data records of history payment transactions, wherein each data record has a historical timestamp; generating, with at least one processor, online simulation data, wherein generating the online simulation data comprises: modifying the historical timestamp of each data record to provide online simulation data; determining, with at least one processor, a timeline for a plurality of data insertion actions and a plurality of data request actions based on the online simulation data; performing, with at least one processor, a simulation of online activities involving a stateful machine learning (ML) model using the timeline for the plurality of data insertion actions and the plurality of data request actions; and validating, with at least one processor, the stateful ML model based on the simulation of online activities.

Clause 9: The computer-implemented method of clause 8, wherein performing the simulation of online activities involving the stateful ML model comprises: performing a feature engineering procedure based on the online simulation data to provide a plurality of features for the simulation of online activities; and validating the plurality of features for the simulation of online activities based on the historical transaction data.

Clause 10: The computer-implemented method of clause 8 or 9, further comprising: performing a feature engineering procedure based on the historical transaction data to provide a plurality of features for the historical transaction data, wherein validating the plurality of features for the simulation of online activities comprises: comparing the plurality of features for the simulation of online activities to the plurality of features for the historical transaction data.

Clause 11: The computer-implemented method of any of clauses 8-10, further comprising: updating a state of the stateful ML model after each data request action of the plurality of data request actions during the simulation of online activities.

Clause 12: The computer-implemented method of any of clauses 8-11, wherein generating the online simulation data comprises: performing one or more data conversion operations on the historical transaction data.

Clause 13: The computer-implemented method of any of clauses 8-12, wherein modifying the historical timestamp of each data record comprises: replacing the historical timestamp of each data record with a relative timestamp.

Clause 14: The computer-implemented method of any of clauses 8-13, wherein performing the simulation of online activities involving the stateful ML model comprises: generating a simulation score of the stateful ML model based on the online simulation data; and wherein validating the stateful ML model comprises: comparing the simulation score of the stateful ML model to a predetermined score.

Clause 15: A computer program product comprising at least one non-transitory computer-readable medium including one or more instructions that, when executed by at least one processor, cause the at least one processor to: receive historical transaction data, wherein the historical transaction data comprises a plurality of data records of history payment transactions, wherein each data record has a historical timestamp; generate online simulation data, wherein the one or more instructions that cause the at least one processor to generate the online simulation data, cause the at least one processor to: modify the historical timestamp of each data record to provide online simulation data; determine a timeline for a plurality of data insertion actions and a plurality of data request actions based on the online simulation data; perform a simulation of online activities involving a stateful machine learning (ML) model using the timeline for the plurality of data insertion actions and the plurality of data request actions; and validate the stateful ML model based on the simulation of online activities.

Clause 16: The computer program product of clause 15, wherein the one or more instructions that cause the at least one processor to perform the simulation of online activities involving the stateful ML model, cause the at least one processor to: perform a feature engineering procedure based on the online simulation data to provide a plurality of features for the simulation of online activities; and validate the plurality of features for the simulation of online activities based on the historical transaction data.

Clause 17: The computer program product of clause 15 or 16, wherein the one or more instructions further cause the at least one processor to: update a state of the stateful ML model after each data request action of the plurality of data request actions during the simulation of online activities.

Clause 18: The computer program product of any of clauses 15-17, wherein the one or more instructions that cause the at least one processor to generate the online simulation data, cause the at least one processor to: perform one or more data conversion operations on the historical transaction data.

Clause 19: The computer program product of any of clauses 15-18, wherein the one or more instructions that cause the at least one processor to modify the historical timestamp of each data record, cause the at least one processor to: replace the historical timestamp of each data record with a relative timestamp.

Clause 20: The computer program product of any of clauses 15-19, wherein the one or more instructions that cause the at least one processor to perform the simulation of online activities involving the stateful ML model, cause the at least one processor to: generate a simulation score of the stateful ML model based on the online simulation data; and wherein the one or more instructions that cause the at least one processor to validate the stateful ML model, cause the at least one processor to: compare the simulation score of the stateful ML model to a predetermined score.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
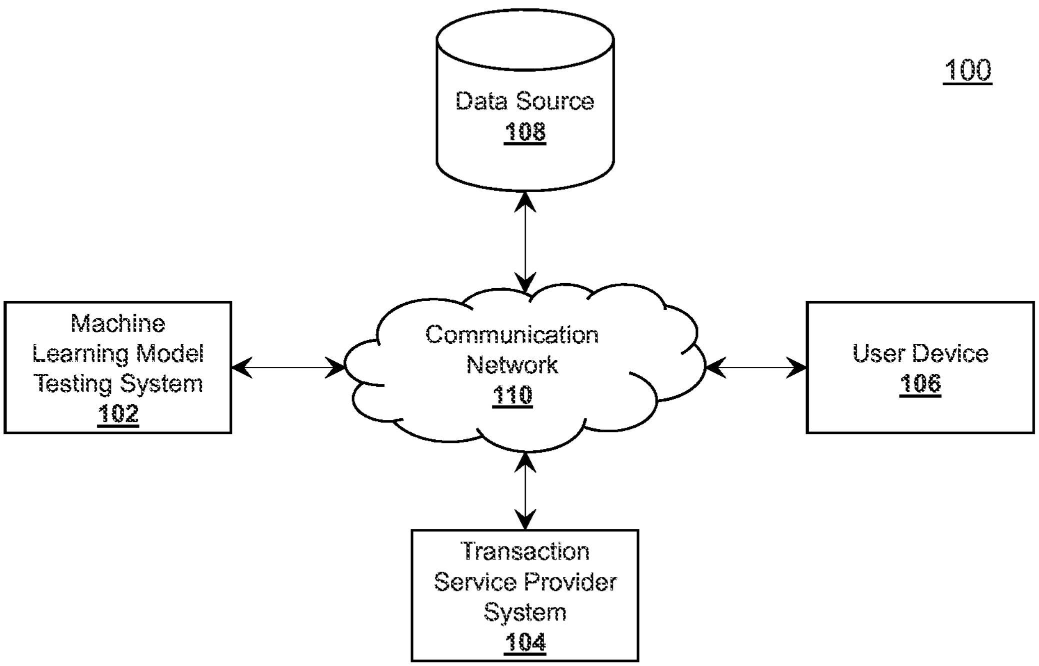
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phrase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for testing a machine learning (ML) model based on simulations in an offline environment using offline data. In some non-limiting embodiments or aspects, the ML model testing system may include at least one processor programmed or configured to receive historical transaction data, where the historical transaction data includes a plurality of data records of history payment transactions, wherein each data record has a historical timestamp, generate online simulation data, when generating the online simulation data, the at least one processor is programmed or configured to: modify the historical timestamp of each data record to provide online simulation data, determine a timeline for a plurality of data insertion actions and a plurality of data request actions based on the online simulation data, perform a simulation of online activities involving a stateful ML model using the timeline for the plurality of data insertion actions and the plurality of data request actions, and validate the stateful ML model based on the simulation of online activities.

In some non-limiting embodiments, when performing the simulation of online activities involving the stateful ML model, the at least one processor is programmed or configured to perform a feature engineering procedure based on the online simulation data to provide a plurality of features for the simulation of online activities and validate the plurality of features for the simulation of online activities based on the historical transaction data. In some non-limiting embodiments, the at least one processor is further programmed or configured to perform a feature engineering procedure based on the historical transaction data to provide a plurality of features for the historical transaction data and, when validating the plurality of features for the simulation of online activities, the at least one processor is programmed or configured to compare the plurality of features for the simulation of online activities to the plurality of features for the historical transaction data.

In some non-limiting embodiments, the at least one processor is further programmed or configured to update a state of the stateful ML model after each data request action of the plurality of data request actions during the simulation of online activities. In some non-limiting embodiments or aspects, when generating the online simulation data, the at least one processor is programmed or configured to perform one or more data conversion operations on the historical transaction data. In some non-limiting embodiments or aspects, when modifying the historical timestamp of each data record, the at least one processor is programmed or configured to replace the historical timestamp of each data record with a relative timestamp In some non-limiting embodiments or aspects, when performing the simulation of online activities involving the stateful ML model, the at least one processor is programmed or configured to generate a simulation score of the stateful ML model based on the online simulation data, and, when validating the stateful ML model, the at least one processor is programmed or configured to compare the simulation score of the stateful ML model to a predetermined score.

In this way, the ML model testing system may provide a simulation environment to combine data sources, including historical offline data sources, together within an expected timeline, that allows for a timestamp for each data insertion and/or data retrieval action, and allow for the difference of online and offline data content by applying data conversion as required. Further, the ML model testing system may simulate online feature engineering and/or feature scoring, for example, based on timestamps.

Referring now to FIG. 1, FIG. 1 is a diagram of an example environment 100 in which devices, systems, and/or methods, described herein, may be implemented. As shown in FIG. 1, environment 100 may include ML model testing system 102, transaction service provider system 104, user device 106, data source 108, and communication network 110. ML model testing system 102, transaction service provider system 104, user device 106, and/or data source 108 may interconnect (e.g., establish a connection to communicate) via wired connections, wireless connections, or a combination of wired and wireless connections.

ML model testing system 102 may include one or more devices configured to communicate with transaction service provider system 104, user device 106, and/or data source 108 via communication network 110. For example, ML model testing system 102 may include a server, a group of servers, and/or other like devices. In some non-limiting embodiments or aspects, ML model testing system 102 may be associated with a transaction service provider system, as described herein. Additionally or alternatively, ML model testing system 102 may generate (e.g., train, test, validate, retrain, and/or the like), store, and/or implement (e.g., operate, provide inputs to and/or outputs from, and/or the like) one or more ML models. In some non-limiting embodiments or aspects, ML model testing system 102 may be in communication with a data storage device (e.g., data source 108), which may be local or remote to ML model testing system 102. In some non-limiting embodiments or aspects, ML model testing system 102 may be capable of receiving information from, storing information in, transmitting information to, and/or searching information stored in the data storage device.

Transaction service provider system 104 may include one or more devices configured to communicate with ML model testing system 102, user device 106, and/or data source 108 via communication network 110. For example, transaction service provider system 104 may include a computing device, such as a server, a group of servers, and/or other like devices. In some non-limiting embodiments or aspects, transaction service provider system 104 may be associated with a transaction service provider as discussed herein. In some non-limiting embodiments or aspects, ML model testing system 102 may be a component of transaction service provider system 104.

User device 106 may include a computing device configured to communicate with ML model testing system 102, transaction service provider system 104, and/or data source 108 via communication network 110. For example, user device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 106 may be associated with a user (e.g., an individual operating user device 106).

With continued reference to FIG. 1, data source 108 may include a computing device (e.g., a database device) configured to communicate with ML model testing system 102, transaction service provider system 104, and/or user device 106 via communication network 110. For example, data source 108 may include a server, a group of servers, and/or other like devices. In some non-limiting embodiments or aspects, data source 108 may be associated with one or more computing devices providing interfaces, such that a user may interact with data source 108 via the one or more computing devices. Data source 108 may be in communication with ML model testing system 102, transaction service provider system 104, and/or user device 106, such that data source 108 is separate from ML model testing system 102, transaction service provider system 104 and/or the user device 106. Alternatively, in some non-limiting embodiments or aspects, data source 108 may be part of (e.g., a component of) ML model testing system 102, transaction service provider system 104, and/or user device 106.

In some non-limiting embodiments or aspects, data source 108 may include an offline data source. In some non-limiting embodiments or aspects, an offline data source may refer to a data source storing historical data (e.g., data that has been previously collected and/or recorded) that may be available to ML model testing system 102, transaction service provider system 104, and/or user device 106. For example, an offline data source may store data is available and has already been collected and does not need to rely on collecting new data (e.g., live data, online data, etc.). In some non-limiting embodiments or aspects, data source 108 may include software and/or hardware that is capable of storing and/or processing large amounts of data using one or more computing devices in a distributed manner (e.g., Apache™, Hadoop®, and/or the like).

Communication network 110 may include one or more wired and/or wireless networks. For example, communication network 110 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
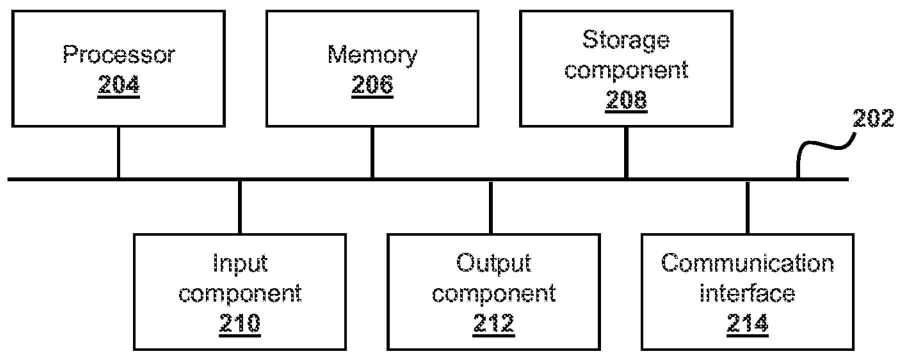
FIG. 2 is a diagram of a non-limiting embodiment or aspect of components of one or more devices of FIG. 1.

Referring now to FIG. 2, FIG. 2 is a diagram of example components of a device 200. Device 200 may correspond to ML model testing system 102 (e.g., one or more devices of ML model testing system 102), transaction service provider system 104 (e.g., one or more devices of transaction service provider system 104), user device 106, and/or data source 108. In some non-limiting embodiments or aspects, ML model testing system 102, transaction service provider system 104, user device 106, and/or data source 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
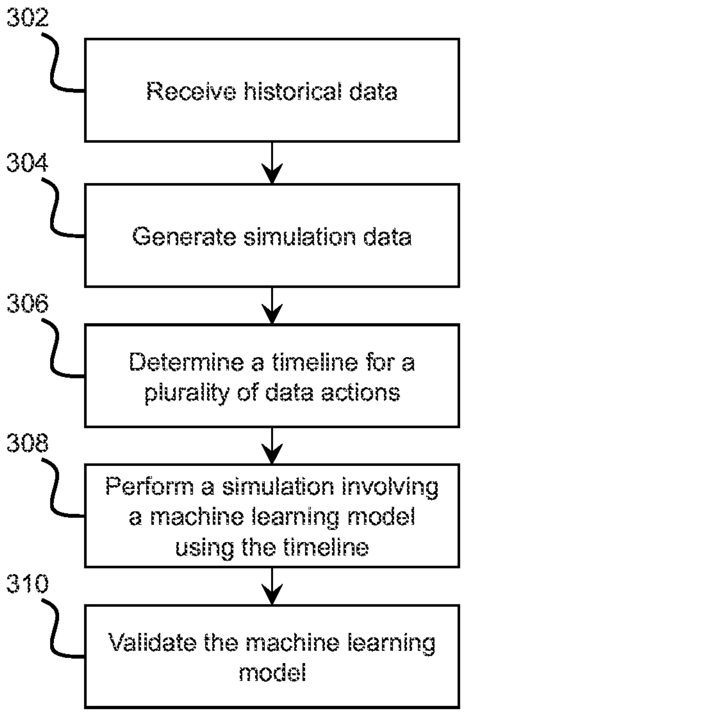
FIG. 3 is a flowchart of a non-limiting embodiment or aspect of a process for testing a machine learning (ML) model based on simulations in an offline environment using offline data.

Referring now to FIG. 3, FIG. 3 is a flowchart of a non-limiting embodiment or aspect of a process 300 for testing an ML model based on simulations in an offline environment using offline data. In some non-limiting embodiments or aspects, one or more of the steps of process 300 may be performed (e.g., completely, partially, etc.) by ML model testing system 102 (e.g., one or more devices of ML model testing system 102). In some non-limiting embodiments or aspects, one or more of the steps of process 300 may be performed (e.g., completely, partially, etc.) by another device or a group of devices separate from or including ML model testing system 102 (e.g., one or more devices of ML model testing system 102), transaction service provider system 104 (e.g., one or more devices of transaction service provider system 104), user device 106, and/or data source 108.

In some non-limiting embodiments or aspects, one or more of the steps of a process (e.g., process 300) may be performed during a training phase. The training phase may include an environment (e.g., a training environment) and/or a time period (e.g., training phase, model building phase, and/or the like) where an ML model (e.g., an ML algorithm) may be trained. Training may refer to inputting training input data (e.g., a training dataset) into one or more ML models (e.g., one or more ML models and/or algorithms of ML model testing system 102), applying labels to the training input data for training, and/or mapping the training input data to one or more target values (e.g., ground truth values, the values that a trained ML model may predict, and/or the like), for the purpose of generating the trained ML model. In some non-limiting embodiments or aspects, training may be performed during a training phase which may occur before a testing phase and before a runtime (e.g., inference, production) phase. During a time period associated with the training phase, the ML model may process the training input data to find patterns in the training input data that map the training input data (e.g., features and/or attributes of the training input data) to the one or more target values to generate the trained ML model.

In some non-limiting embodiments or aspects, one or more of the steps of a process (e.g., process 300) may be performed during a testing phase. The testing phase may include an environment (e.g., a testing environment) and/or a time period (e.g., a testing phase, model evaluation phase, and/or the like) where the ML model (e.g., the trained ML model, a trained inference model, and/or the like) may be tested (e.g., evaluated, validated, and/or the like). Testing (e.g., evaluating) may refer to inputting testing input data (e.g., a testing dataset, an evaluation dataset) into one or more trained ML models (e.g., one or more trained ML models of ML model testing system 102) and/or determining a metric associated with an accuracy of the trained ML model based on the testing input data. In some non-limiting embodiments or aspects, the testing input data may include a sample of data including target values generated during the training phase based on the training input data (e.g., output from the training phase, a sample of data that has labels applied with the target values during training). In some non-limiting embodiments or aspects, determining a metric associated with an accuracy of the trained ML model based on the testing input data may include comparing the testing input data with testing output data (e.g., test inferences, test predictions) from the trained ML model. For example, a metric associated with an accuracy may be determined by comparing labels applied to the testing output data with the target values of the sample of data in the testing input data. In some non-limiting embodiments or aspects, testing may be performed during a testing phase which may occur after a training phase and before deployment of the ML model and/or a runtime (e.g., inference, production) phase. During a time period associated with the testing phase, the ML model (e.g., the trained ML model) may process the testing input data to determine a metric associated with the accuracy of the trained ML model to test and/or evaluate the trained ML model.

In some non-limiting embodiments or aspects, one or more of the steps of a process (e.g., process 300) may be performed during a runtime phase. The runtime phase may include an environment (e.g., a runtime environment) and/or a time period (e.g., a runtime phase) where a trained and/or tested ML model (e.g., a runtime ML model, an ML production model, a production inference model, and/or the like) may be used to generate inferences (e.g., predictions, real-time inferences, and/or the like). Runtime (e.g., inference, production) may refer to inputting runtime data (e.g., a runtime dataset, real-world data, real-world observations, inference data, and/or the like) into one or more trained and/or tested ML models (e.g., one or more trained ML models of ML model testing system 102) and/or generating an inference (e.g., generating an inference using ML model testing system 102). In some non-limiting embodiments or aspects, the runtime input data may include a sample of data that is received by the trained ML model in real-time with respect to the runtime input data being generated. For example, runtime input data may be generated by a data source (e.g., a customer performing a transaction) and may be subsequently received by the trained and/or tested ML model in real-time. In some non-limiting embodiments or aspects, runtime may be performed during a runtime phase which may occur after a training phase, after a testing phase, and after deployment of the ML model. During a time period associated with the runtime phase, the ML model (e.g., the trained and/or tested ML model, the ML production model) may process the runtime input data to generate inferences (e.g., real-time inferences, real-time predictions, and/or the like).

In some non-limiting embodiments or aspects, real-time may refer to an instant in time with respect to the occurrence of an event (e.g., real-time with respect to a transaction, real-time with respect to data being generated, real-time with respect to the reading or writing of data, etc.) where a response to the event may occur within a specified time, generally a relatively short time. For example, real-time may refer to an instant in time where an inference is generated by the ML model (e.g., the ML model of ML model testing system 102) concurrent with or shortly after (e.g., within milliseconds) the generation of the input data and/or the receipt of the input data by the ML model. As a further example, a real-time output may be generated with respect to a real-time input concurrent with or within milliseconds of receiving the real-time input (e.g., a transaction may be approved immediately concurrent with or shortly after the transaction is initiated by a customer).

As shown in FIG. 3, at step 302, process 300 may include receiving historical data. For example, ML model testing system 102 may receive historical transaction data from data source 108. In some non-limiting embodiments or aspects, ML model testing system 102 may receive historical transaction data from transaction service provider system 104 and/or user device 106. In some non-limiting embodiments or aspects, the historical transaction data may include a plurality of data records (e.g., data entries, transaction records) of history payment transactions (e.g., historical transactions). In some non-limiting embodiments or aspects, each data record of the plurality of data records may include a historical timestamp. For example, each data record of the plurality of data records may include the historical timestamp representing a date and/or a time of day when the data record was recorded and/or when an event (e.g., a transaction) corresponding to the data record occurred.

In some non-limiting embodiments or aspects, ML model testing system 102 may receive historical data for batch processing. For example, ML model testing system 102 may receive historical transaction data (e.g., long-term historical transaction data, long-term historical transaction data up to 90-days old, or collected within the previous 90 days from the day the data is received) from data source 108 for batch processing. In some non-limiting embodiments or aspects, ML model testing system 102 may process the historical transaction data, such that all of the historical transaction data that was received by ML model testing system 102 is processed at one time (e.g., batch processing).

As shown in FIG. 3, at step 304, process 300 may include generating simulation data. For example, ML model testing system 102 may generate online simulation data. In some non-limiting embodiments or aspects, ML model testing system 102 may generate online simulation data by modifying the historical timestamp of each data record of the plurality of data records to provide the online simulation data. For example, ML model testing system 102 may modify the historical timestamp of each data record of the plurality of data records by converting the historical timestamp to a relative timestamp. In some non-limiting embodiments or aspects, a relative timestamp may include a timestamp representing a date and/or a time of day relative to a first reference time selected from the historical timestamps of each data record of the plurality of data records.

In some non-limiting embodiments or aspects, online simulation data may include a plurality of simulation data records. Each simulation data record of the plurality of simulation data records may include a relative timestamp (e.g., a time delta from a reference time value and/or reference timestamp). In some non-limiting embodiments or aspects, when modifying the historical timestamp of each data record, ML model testing system 102 may convert the historical timestamp of each data record of the plurality of data records to a relative timestamp of each simulation data record of a plurality of simulation data records. For example, ML model testing system 102 may convert the historical timestamp of a first data record to a relative timestamp of a first simulation data record of the simulation data by determining a time delta (e.g., a difference of time between the historical timestamp and a reference timestamp). In some non-limiting embodiments or aspects, a relative timestamp may include a timestamp representing a date and/or a time of day relative to a first reference timestamp selected from the historical timestamps of each data record of the plurality of data records of the historical data.

In some non-limiting embodiments or aspects, ML model testing system 102 may select a first reference timestamp from the timestamps of the plurality of data records of the historical data. In some non-limiting embodiments or aspects, ML model testing system 102 may modify the first reference timestamp to generate a first relative timestamp by converting the first reference timestamp to the first relative timestamp. In some non-limiting embodiments or aspects, the first relative timestamp may represent a time of zero (0) (e.g., a start time, an initial time, and/or the like). In some non-limiting embodiments or aspects, the first relative timestamp may correspond to the first simulation data record of the online simulation data.

In some non-limiting embodiments or aspects, ML model testing system 102 may modify the historical timestamp of each data record of the plurality of data records of the historical transaction data based on the first reference timestamp selected from the historical timestamps and based on the first relative timestamp of the first simulation data record of the online simulation data. In some non-limiting embodiments or aspects, ML model testing system 102 may generate relative timestamps for simulation data records subsequent to the first simulation data record by modifying the timestamp of the data record of the historical transaction data that corresponds to a subsequent simulation data record based on the first relative timestamp of the simulation data records, the first reference timestamp selected from the historical timestamps, and the timestamp of the data record of the historical transaction data that corresponds to the subsequent simulation data record. For example, ML model testing system 102 may generate a relative timestamp of the second simulation data record of the simulation data by modifying the timestamp of the second data record of the historical transaction data (e.g., the data record of the historical transaction data corresponding to the subsequent simulation data record, in this example, the second simulation data record) based on the first relative timestamp of the simulation data records, the first reference timestamp selected from the historical timestamps, and the timestamp of the second data record.

In some non-limiting embodiments or aspects, ML model testing system 102 may generate relative timestamps for simulation data records subsequent to the first simulation data record by determining a difference of time (e.g., a time delta) between the historical timestamp of the data record of the historical transaction data that corresponds to the subsequent simulation data record and the first reference timestamp selected from the historical timestamps. For example, ML model testing system 102 may generate a relative timestamp of a third simulation data record by determining a difference of time between the historical timestamp of the third data record of the historical transaction data and the first reference timestamp selected from the historical timestamps.

In some non-limiting embodiments or aspects, ML model testing system 102 may sequence each simulation data record of the plurality of simulation data records. In some non-limiting embodiments or aspects, ML model testing system 102 may sequence each simulation data record of the plurality of simulation data records based on the relative timestamp of each simulation data record. For example, ML model testing system 102 may sequence each simulation data record of the plurality of simulation data in order from the earliest relative timestamp to the latest relative timestamp to provide sequenced online simulation data. In this way, ML model testing system 102 may perform the simulation of online activities using the sequenced simulation data to simulate actual events (e.g., the sequence of actual events).

In some non-limiting embodiments or aspects, ML model testing system 102 may sequence each simulation data record of the plurality of simulation data records based on a factor and/or category of the online simulation data (e.g., features of the online simulation data, identifiers of the online simulation data, and/or the like). For example, ML model testing system 102 may sequence each simulation data record of the plurality of simulation data records based on an issuer bank associated with each simulation data record of the plurality of simulation data records. In this way, ML model testing system 102 may process data (e.g., online simulation data records) that originated (e.g., was generated) based on a first issuer bank before processing data that originated from other issuer banks. In this case, ML model testing system 102 may sequence each simulation data record of the plurality of simulation data records independent of the relative timestamps of each simulation data record.

In some non-limiting embodiments or aspects, ML model testing system 102 may randomize the order of each simulation data record of the plurality of simulation data based on the relative timestamp of each simulation data record to provide random online simulation data. In this way, ML model testing system 102 may perform the simulation of online activities using the random online simulation data to simulate disturbance in actual events (e.g., data being out of order, abnormal data delay, and/or the like).

In some non-limiting embodiments or aspects, when generating the online simulation data, ML model testing system 102 may perform one or more data conversion operations on the historical transaction data. In some non-limiting embodiments or aspects, when modifying the historical timestamp of each data record of the plurality of data records, ML model testing system 102 may replace the historical timestamp of each data record with a relative timestamp to provide a plurality of relative timestamps corresponding to a plurality of simulation data records. In some non-limiting embodiments or aspects, the online simulation data may include the plurality of relative timestamps and the plurality of simulation data records.

In some non-limiting embodiments or aspects, ML model testing system 102 may perform one or more data conversion operations on one or more features included in the historical transaction data. For example, ML model testing system 102 may perform a data conversion operation on a name (e.g., a field name) of the one or more features of the historical transaction data. In some non-limiting embodiments or aspects, ML model testing system 102 may perform one or more data conversion operations on one or more data types of the one or more features included in the historical transaction data. For example, ML model testing system 102 may perform a data conversion operation on the one or more features of the historical transaction data to convert a data type of Boolean to a data type of integer of the one or more features of the historical transaction data. In this way, ML model testing system 102 may convert the data types of the historical transaction data into data that has a configuration that is capable of being processed by ML model testing system 102.

As shown in FIG. 3, at step 306, process 300 may include determining a timeline for a plurality of data actions. For example, ML model testing system 102 may determine a timeline for a plurality of data insertion actions and a plurality of data request actions based on the online simulation data. In some non-limiting embodiments or aspects, ML model testing system 102 may assign a timestamp to each data insertion action of the plurality of data insertion actions and each data request action of the plurality of data request actions, such that each data insertion action of the plurality of data insertion actions and each data request action of the plurality of data request actions correspond to a point (e.g., location, time value) along the timeline. For example, ML model testing system 102 may determine a timeline for a plurality of data insertion actions and a plurality of data request actions based on assigning a timestamp to each data insertion action of the plurality of data insertion actions and each data request action of the plurality of data request actions.

In some non-limiting embodiments or aspects, ML model testing system 102 may determine the timeline for the plurality of data insertion actions and the plurality of data request actions based on arranging (e.g., orchestrating) the plurality of data insertion actions and the plurality of data request actions in the timeline and selecting the data sources of the plurality of data insertion actions and the plurality of data request actions, such that the timeline may represent a real-time flow of data that may be seen in a production ML model and/or production ML system. In some non-limiting embodiments or aspects, ML model testing system 102 may arrange the plurality of data insertion actions and the plurality of data request actions using a simulation tool and/or a stateful computation application (e.g., Apache™, Flink®, and/or the like). In this way, ML model testing system 102 may determine a timeline that may closely match and/or simulate an actual production environment and/or an actual production ML model and system.

In some non-limiting embodiments or aspects, ML model testing system 102 may assign a timestamp to each data insertion action of the plurality of data insertion actions and each data request action of the plurality of data request actions, such that each data insertion action of the plurality of data insertion actions and each data request action of the plurality of data request actions correspond to a point (e.g., location, time value) along the timeline. For example, ML model testing system 102 may determine a timeline for a plurality of data insertion actions and a plurality of data request actions based on assigning a timestamp to each data insertion action of the plurality of data insertion actions and each data request action of the plurality of data request actions. In some non-limiting embodiments or aspects, ML model testing system 102 may assign a timestamp to each data insertion action of the plurality of data insertion actions and each data request action of the plurality of data request actions based on the relative timestamps of the plurality of simulation data records. For example, ML model testing system 102 may assign a first relative timestamp corresponding to a first simulation data record to a first data insertion action, such that the data insertion action may include the online simulation data that is included in the first simulation data record. In this way, ML model testing system 102 may generate each data insertion action of the plurality of data insertion actions and each data request action of the plurality of data request actions, such that each data insertion action and each data request action within the timeline is associated with (e.g., includes) one or more simulation data records of the online simulation data.

In some non-limiting embodiments or aspects, ML model testing system 102 may determine the timeline for the plurality of data insertion actions and the plurality of data request actions based on assigning a timestamp that is associated with one or more criteria. For example, ML model testing system 102 may determine the timeline for the plurality of data insertion actions and the plurality of data request actions based on assigning a timestamp that is associated with a certain time of day (e.g., a timestamp of 05:00:00 for each day along a timeline). In some non-limiting embodiments or aspects, ML model testing system 102 may assign one or more timestamps that are associated with a random amount of time (e.g., a time interval) between each timestamp. For example, ML model testing system 102 may assign a timestamp to the plurality of data insertion actions and the plurality of data request actions having a random amount of time between the timestamp for each data insertion action of the plurality of data insertion actions and/or each data request action of the plurality of data request actions.

In some non-limiting embodiments or aspects, ML model testing system 102 may assign a timestamp to each data insertion action of the plurality of data insertion actions where the timestamp corresponds to a transaction (e.g., a data insertion action where the data insertion action inserts transaction data and/or transaction features). For example, ML model testing system 102 may assign a timestamp to each data insertion action of the plurality of data insertion actions based on each timestamp and each data insertion action corresponding to a transaction (e.g., the occurrence of a transaction, the insertion of transaction data) along the timeline (e.g., the timeline determined by ML model testing system 102).

As shown in FIG. 3, at step 308, process 300 may include performing a simulation involving the ML model using the timeline. For example, ML model testing system 102 may perform a simulation of online activities involving the stateful ML model using the timeline for the plurality of data insertion actions and the plurality of data request actions. In some non-limiting embodiments or aspects, ML model testing system 102 may perform the simulation of online activities involving the stateful ML model using the timeline for the plurality of data insertion actions and the plurality of data request actions by beginning execution of the simulation of online activities at a time equal to a start time (e.g., a time equal to 0, the beginning of the timeline, the first relative timestamp, and/or the like). In some non-limiting embodiments or aspects, ML model testing system 102 may perform the simulation of online activities by continually (e.g. repeatedly) executing one or more instructions (e.g., one or more read and/or write operations) using a processor for each time step of a plurality of time steps. In some non-limiting embodiments or aspects, a time step (e.g., a simulation frame, a simulation tick, and/or the like) may include any duration of time, such that the simulation of online activities may achieve a desired frequency. For example, if the simulation of online activities should execute at 20 Hertz, then the time step may include 0.05 seconds. Thus, in this one example, ML model testing system 102 may repeatedly execute the one or more instructions of the online simulation every 0.05 seconds, while the simulation of online activities progressed through the timeline.

In some non-limiting embodiments or aspects, ML model testing system 102 may perform the simulation of online activities by continually executing the one or more instructions using a processor for each time step of the plurality of time steps until an end of the timeline is reached. In some non-limiting embodiments or aspects, ML model testing system 102 may terminate (e.g., terminate execution, complete execution, and/or the like) the simulation of online activities at any time (e.g., timestamp) along the timeline.

In some non-limiting embodiments or aspects, ML model testing system 102 may perform the simulation of online activities by continually executing the one or more instructions using a processor for each time step of the plurality of time steps based on the timeline for the plurality of data insertion actions and the plurality of data request actions. For example, ML model testing system 102 may continually execute the one or more instructions using a processor for each time step of the plurality of time steps to generate a time value (e.g., a simulation time value of a simulation clock and/or the like). In some non-limiting embodiments or aspects, the time value may be generated based on a clock associated with a computing device that may be a component of ML model testing system 102, a clock associated with ML model testing system 102, and/or based on continually executing the one or more instructions using a processor for each time step of the plurality of time steps. For example, ML model testing system 102 may generate the time value based on a duration of time that ML model testing system 102 has continually executed the one or more instructions of the online simulation. In some non-limiting embodiments or aspects, ML model testing system 102 may generate the time value based on a total number of time steps that have passed, while ML model testing system 102 continually executes the one or more instructions of the online simulation.

In some non-limiting embodiments or aspects, ML model testing system 102 may perform the simulation of online activities by performing read operations (e.g., reading data from storage, memory, and/or the like) and/or by performing writing operations (e.g., writing data to storage, memory, and/or the like). In some non-limiting embodiments or aspects, ML model testing system 102 may perform read operations and/or write operations by reading and/or writing data to a data storage device and/or a software and/or a hardware storage component (e.g., database). For example, ML model testing system 102 may perform read operations and/or write operations using an in-memory data storage component and/or an in-memory data storage application (e.g., Redis®).

In some non-limiting embodiments or aspects, ML model testing system 102 may initialize an in-memory storage component and/or an in-memory data storage application locally (e.g., on a local computing device, a computing device that is a component of ML model testing system 102, and/or the like) before performing read operations and/or write operations to perform the simulation of online activities. In this way, ML model testing system 102 may use an in-memory data storage component and/or an in-memory data storage application that has a clean state at the start of a simulation of online activities. Using a clean state of an in-memory data storage component and/or an in-memory data storage application may allow ML model testing system 102 to perform a plurality of simulations of online activities, each simulation of online activities using a clean state of an in-memory data storage component and/or an in-memory data storage application.

In some non-limiting embodiments or aspects, when performing the simulation of online activities involving the stateful ML model, ML model testing system 102 may update (e.g., generate an update request action) a state of the stateful ML model after each data insertion action of the plurality of data insertion actions within the timeline during the simulation of online activities. In some non-limiting embodiments or aspects, ML model testing system 102 may update a state of the stateful ML model after each data request action of the plurality of data request actions during the simulation of online activities. In some non-limiting embodiments or aspects, ML model testing system 102 may update a state of the stateful ML model based on one or more data request actions received as a result of Stand-In Processing (STIP).

In some non-limiting embodiments, ML model testing system 102 may generate the stateful ML model (e.g., a transaction stateful ML model). For example, ML model testing system 102 may generate the stateful ML model based on data associated with a plurality of transactions (e.g., data associated with the plurality of data insertion actions, data associated with a plurality of data request actions, historical transaction data, simulation data, and/or the like).

In some non-limiting embodiments or aspects, the stateful ML model may refer to an ML model that may update and/or maintain a state of layers and/or weights of the ML model for each batch of training data (e.g., each training dataset) that the ML model processes during training. For example, the stateful ML model may receive a first training dataset as input for training. The stateful ML model may process the first training dataset, and the stateful ML model may update the layers and/or weights of the stateful ML model accordingly when processing the first training dataset to provide a stateful ML model having a first state. The stateful ML model may then receive a second training dataset as input for training. The stateful ML model may process the second training dataset, and the stateful ML model may update the layers and/or weights of the stateful ML model accordingly when processing the second training dataset to provide the stateful ML model having a first state and a second state. In some non-limiting embodiments or aspects, each state associated with the stateful ML model (e.g., the first state, the second state, the third state, etc.) may be stored in a storage component, such that the state may be loaded by a processor and applied to the stateful ML model. In some non-limiting embodiments or aspects, the stateful ML model may refer to the ML model that may be updated over time when the ML model is provided with training data (e.g., as inputs) over time. In some instances, a stateful ML model may refer to the ML model that is dependent on historical data (e.g., historical transaction data that has been seen by the model and/or that has been input to the model) to learn and/or generate inferences.

In some non-limiting embodiments or aspects, the stateful ML model may refer to an ML model that may be updated over time when the ML model is provided with testing data (e.g., as inputs) over time. In some non-limiting embodiments or aspects, the stateful ML model may refer to the ML model that may be updated over time when the ML model is provided with production (e.g., inference) data (e.g., as inputs) over time for generating predictions and/or inferences.

In some non-limiting embodiments, the stateful ML model may be designed to receive, as an input, data associated with a transaction (e.g., transaction data associated with the plurality of data insertion actions and/or the plurality of data request actions), and provide, as an output, a prediction as to whether the transaction is relevant with regard to a particular area of transactions. For example, the stateful ML model may receive the input and may provide the output that includes a prediction that the transaction is relevant to an issue of transactions. In another example, the stateful ML model may receive the input and may provide the output that includes a prediction of a category of a plurality of categories of transactions to which the transaction may be assigned.

In some non-limiting embodiments, the stateful ML model may be designed to receive, as an input, one or more variables (e.g., features) associated with a transaction, which may be identified as predictor variables and associated with other variables included in a transaction (e.g., one or more identifiers included in a transaction), and provide, as an output, a prediction (e.g., a probability, a binary output, a yes-no output, a score, a prediction score, and/or the like) that the transaction should be assigned to a category of a plurality of categories associated with transactions.

In some non-limiting embodiments, ML model testing system 102 may receive data from user device 106 and/or other devices (e.g., other user devices 106). ML model testing system 102 may analyze the data to generate the stateful ML model based on receiving the data. In some non-limiting embodiments or aspects, ML model testing system 102 may generate the stateful ML model by generating a rule for the stateful ML model based on the data (e.g., historical data) associated with a plurality of transactions. In some non-limiting embodiments, historical data may include data associated with one or more transactions that have been assigned (e.g., previously assigned) to a category associated with transactions.

In some non-limiting embodiments, ML model testing system 102 may analyze the training data to generate the stateful ML model. For example, ML model testing system 102 may use ML techniques to analyze the training data to generate the stateful ML model. In some non-limiting embodiments, generating the stateful ML model (e.g., based on training data obtained from historical data) may be referred to as training the stateful ML model. The ML techniques may include, for example, supervised and/or unsupervised techniques, such as decision trees, logistic regressions, artificial neural networks, Bayesian statistics, learning automata, Hidden Markov Modeling, linear classifiers, quadratic classifiers, association rule learning, or the like. In some non-limiting embodiments, the ML techniques may include supervised techniques, such as artificial neural networks (e.g., convolution neural networks) and/or the like. In some non-limiting embodiments or aspects, the stateful ML model may include a model that is specific to a particular category, a particular set of categories, a particular group of users, a particular geographic location (e.g., a city, a state, a country, etc.), and/or the like. Additionally or alternatively, the stateful ML model may be specific to a particular organization (e.g., a particular business entity, a particular issuer institution, etc.). In some non-limiting embodiments or aspects, ML model testing system 102 may generate one or more stateful ML models for one or more organizations, one or more groups associated with a particular category, and/or a particular group of users.

Additionally or alternatively, when analyzing the training data, ML model testing system 102 may identify one or more variables (e.g., one or more independent variables, one or more features) as predictor variables that may be used to make a prediction (e.g., when analyzing the training data). In some non-limiting embodiments or aspects, values of the predictor variables may be inputs to the stateful ML model. For example, ML model testing system 102 may identify a subset (e.g., a proper subset) of the variables as predictor variables that may be used to accurately predict a category to which a transaction may be assigned. In some non-limiting embodiments or aspects, the predictor variables may include one or more of the variables, as discussed above, which have a significant impact (e.g., an impact satisfying a threshold) on a probability that a transaction is to be assigned to a category of a plurality of categories of transactions, as determined by ML model testing system 102.

In some non-limiting embodiments, ML model testing system 102 may process the data to obtain training data for the stateful ML model. For example, ML model testing system 102 may process the data to change the data into a format that may be analyzed (e.g., by ML model testing system 102) to generate the stateful ML model. The data that is changed may be referred to as training data. In some non-limiting embodiments or aspects, ML model testing system 102 may process the data to obtain the training data based on receiving the data. Additionally or alternatively, ML model testing system 102 may process the data to obtain the training data based on ML model testing system 102 receiving an indication that ML model testing system 102 is to process the data from a user (e.g., a user of user device 106) of ML model testing system 102, such as when ML model testing system 102 receives an indication to create the stateful ML model for a time interval corresponding to the data.

In some non-limiting embodiments or aspects, ML model testing system 102 may store the stateful ML model. For example, ML model testing system 102 may store the stateful ML model in a data structure (e.g., a database, a linked list, a tree, and/or the like). The data structure may be located within ML model testing system 102 or external, and possibly remote from, ML model testing system 102. In one example, the data structure may be located in data source 108.

In some non-limiting embodiments or aspects, when performing the simulation of online activities involving the stateful ML model, ML model testing system 102 may perform a feature engineering procedure based on the online simulation data to provide a plurality of features for the simulation of online activities. For example, ML model testing system 102 may generate features based on the online simulation data. In some non-limiting embodiments or aspects, ML model testing system 102 may perform a feature engineering procedure based on the historical transaction data to provide a plurality of features for the historical transaction data.

In some non-limiting embodiments or aspects, when performing the simulation of online activities involving the stateful ML model, ML model testing system 102 may validate the plurality of features for the simulation of online activities based on the historical transaction data. In some non-limiting embodiments or aspects, when performing the simulation of online activities involving the stateful ML model, ML model testing system 102 may generate a simulation score of the stateful ML model based on the online simulation data.

In some non-limiting embodiments or aspects, ML model testing system 102 may assign a timestamp to each data insertion action of the plurality of data insertion actions where the timestamp corresponds to a transaction (e.g., a data insertion action inserting transaction data and/or transaction features). For example, ML model testing system 102 may assign a timestamp to each data insertion action of the plurality of data insertion actions where each timestamp and each data insertion action corresponds to a transaction (e.g., the occurrence of a transaction, the insertion of transaction data) along the timeline (e.g., the timeline determined by ML model testing system 102). In some non-limiting embodiments or aspects, the timestamp assigned to a data insertion action may include a time delay (e.g., an amount of time after the data insertion action). In some non-limiting embodiments or aspects, the time delay may account for the time required to execute the stateful ML model after the data insertion action is executed (e.g., while ML model testing system 102 performs a simulation involving the stateful ML model). In some non-limiting embodiments or aspects, the time delay may represent an amount of time required for ML model testing system 102 to receive data when data (e.g., historical data and/or real-time data) is transmitting from a data source (e.g., data source 108) to ML model testing system 102 in real-time or near real-time (e.g., an amount of time within 200 milliseconds to 2 seconds for data to be transmitted from a data source until the data is received by ML model testing system 102). For example, a first data source may represent a first issuer system and may have an average time delay equal to 300 milliseconds. ML model testing system 102 may assign a time delay of 300 milliseconds to a data insertion action that inserts data originating from (e.g., transmitted from, simulating transmission from) the first issuer system. In this way, ML model testing system 102 may perform a simulation of online activities using a time delay that is expected, which may be based on the actual (e.g., non-simulated) transmission of online data.

In some non-limiting embodiments or aspects, ML model testing system 102 may assign a time delay to each data insertion action of the plurality of data insertion actions. In some non-limiting embodiments or aspects, ML model testing system 102 may assign a time delay to each data insertion action of the plurality of data insertion actions based on the data source (e.g., data source 108) that transmitted the historical data (e.g., historical transaction data) associated with the data insertion action. For example, ML model testing system 102 may assign a first time delay to a data insertion action associated with historical data that may be transmitted from a first data source, and ML model testing system 102 may assign a second time delay to a data insertion action associated with historical data transmitted from a second data source.

In some non-limiting embodiments or aspects, ML model testing system 102 may trigger a data insertion action based on the timestamp assigned to the data insertion action, while performing the simulation of online activities. For example, ML model testing system 102 may trigger a data insertion action associated with a transaction (e.g., the occurrence of a transaction, transaction data, and/or the like) based on the timestamp assigned to the data insertion action, while performing the simulation of online activities. In some non-limiting embodiments or aspects, ML model testing system 102 may trigger generation of features based on the timestamp assigned to the data insertion action, while performing the simulation of online activities. For example, ML model testing system 102 may trigger a data insertion action associated with generating features (e.g., features of a transaction, features associated with transaction data, and/or the like) based on the timestamp assigned to the data insertion action, while performing the simulation of online activities. In some non-limiting embodiments or aspects, ML model testing system 102 may trigger a data insertion action based on the timestamp assigned to the data insertion action and a delay time assigned to the data insertion action.

In some non-limiting embodiments or aspects, ML model testing system 102 may trigger a data request action (e.g., while ML model testing system 102 performs a simulation of online activities) associated with a request for an inference from the ML model (e.g., the stateful ML model). In some non-limiting embodiments or aspects, ML model testing system 102 may trigger the data request action based on the timeline for the plurality of data insertion actions and the plurality of data request actions. For example, ML model testing system 102 may trigger the data request action based on the timestamp assigned to the data request action within the timeline for the plurality of data insertion actions and the plurality of data request actions. In some non-limiting embodiments or aspects, when performing the simulation of online activities, ML model testing system 102 may trigger the data request action when the time value (e.g., simulation clock) is equal to the timestamp assigned to the data request action.

In some non-limiting embodiments or aspects, when ML model testing system 102 triggers a data request action, ML model testing system 102 may generate features based on the historical data, the online simulation data, and/or the stateful ML model (e.g., the state of the stateful ML model at the time the data request action is triggered within the timeline of the plurality of data insertion actions and the plurality of data request actions). In some non-limiting embodiments or aspects, when ML model testing system 102 triggers a data request action, ML model testing system 102 may generate scores based on the historical data, the online simulation data, and/or the stateful ML model.

In some non-limiting embodiments or aspects, when ML model testing system 102 triggers a data request action, ML model testing system 102 may pause execution (e.g., not execute) of data insertion actions during the simulation of online activities. For example, ML model testing system 102 may not execute any data insertion actions simultaneously with the triggering and/or execution of a data request action, and ML model testing system 102 may not execute any data insertion actions during any delay time assigned to the data request action that has been triggered and/or executed. In this way, ML model testing system 102 may execute data request actions to serve as a pause (e.g., breakpoint) on the execution of data insertion actions. In some non-limiting embodiments or aspects, ML model testing system 102 may terminate the simulation of online activities at any time along the timeline and/or after ML model testing system 102 has triggered each of the data insertion actions of the plurality of insertion actions and/or each data request action of the plurality of data request actions.

In some non-limiting embodiments or aspects, ML model testing system 102 may generate a response (e.g., a response associated with a data request action) based on triggering a data request action and/or an update request action (e.g., an action requesting an update to a state of the stateful ML model). In some non-limiting embodiments or aspects, the response may include a response status code, a response header, and/or a response body. In some non-limiting embodiments or aspects, the data request action and/or the response may be based on a request associated with a Representation State Transfer (REST) application programming interface (API) call. For example, ML model testing system 102 may trigger a data request action by generating and/or executing the REST API call to process transaction data, and ML model testing system 102 may generate the REST API response based on the REST API call and/or data request action. In some non-limiting embodiments or aspects, the data request action, update request, and/or the response may be based on a request associated with a remote procedure call (e.g., gRPC). For example, ML model testing system 102 may trigger an update (e.g., update request action) to update a state of the stateful ML model by generating and/or executing the gRPC remote procedure call.

In some non-limiting embodiments or aspects, ML model testing system 102 may analyze the historical data, the simulation data, and/or the timeline for the plurality of data insertion actions and the plurality of data request actions using an ML technique. For example, ML model testing system 102 may analyze the timeline for the plurality of data insertion actions and the plurality of data request actions using an ML technique, while performing the simulation of online activities. In some non-limiting embodiments, ML model testing system 102 may analyze a data request action using the stateful ML model. For example, ML model testing system 102 may generate a request associated with a data request action as an input to the stateful ML model (e.g., a transaction analysis ML model), and ML model testing system 102 may receive an output (e.g., a response) from the stateful ML model based on the input. The output may include an indication of whether the input is relevant with regard to a specific characteristic. For example, the output may include an indication of whether a transaction associated with the data request action is fraudulent.

In some non-limiting embodiments or aspects, when analyzing the timeline for the plurality of data insertion actions and the plurality of data request actions using the stateful ML model, ML model testing system 102 may classify a transaction (e.g., a transaction associated with a data request action) using the stateful ML model and/or score (e.g., rate, rank, provide a confidence score, etc.) the transaction using the stateful ML model.

In some non-limiting embodiments or aspects, when classifying the transaction, ML model testing system 102 may determine a classification associated with a category of transactions to which the transaction is to be assigned (e.g., labeled). In some non-limiting embodiments or aspects, when scoring the transaction, ML model testing system 102 may determine a metric (e.g., a rating, a ranking, a score, such as a confidence score, etc.) regarding a predicted accuracy of a classification associated with a category of transactions to which the transaction is to be assigned (e.g., labeled) provided by the stateful ML model. In some non-limiting embodiments or aspects, ML model testing system 102 may classify the transaction, while performing the simulation of online activities.

As shown in FIG. 3, at step 310, process 300 may include validating the machine learning model. For example, ML model testing system 102 may validate the stateful ML model based on the simulation of online activities. In some non-limiting embodiments or aspects, ML model testing system 102 may validate the stateful ML model after ML model testing system 102 generates the stateful ML model. In some non-limiting embodiments, ML model testing system 102 may validate the stateful ML model based on a portion of the training data (e.g., historical transaction data and/or online simulation data) to be used for validation. For example, ML model testing system 102 may partition the training data into a first portion and a second portion, where the first portion may be used to generate the stateful ML model, as described above. In this example, the second portion of the training data (e.g., the validation data) may be used to validate the stateful ML model.

In some non-limiting embodiments or aspects, ML model testing system 102 may validate the stateful ML model by providing validation data associated with a transaction (e.g., data associated with one or more transactions, data associated with one or more transactions assigned to a category, data associated with one or more transactions assigned to one or more categories of a plurality of categories, and/or the like) as input to the stateful ML model, and determining, based on an output of the stateful ML model, whether the stateful ML model correctly, or incorrectly, predicted that a transaction is to be assigned to a category. In some non-limiting embodiments or aspects, ML model testing system 102 may validate the stateful ML model based on a validation threshold. For example, ML model testing system 102 may be configured to validate the stateful ML model when a threshold value (e.g., the validation threshold) of transactions are correctly predicted by the stateful ML model (e.g., when the stateful ML model correctly predicts 50% of the transactions are to be assigned to a category, 70% of the transactions are to be assigned to a category, a threshold number of the transactions are to be assigned to a category, and/or the like).

In some non-limiting embodiments or aspects, when validating the plurality of features for the simulation of online activities, ML model testing system 102 may compare the plurality of features for the simulation of online activities to the plurality of features for the historical transaction data. In some non-limiting embodiments or aspects, when validating the stateful ML model based on the online simulation data, ML model testing system 102 may compare the simulation score of the stateful ML model to a predetermined score.

In some non-limiting embodiments or aspects, if ML model testing system 102 does not validate the stateful ML model (e.g., when a percentage of correctly predicted transactions does not satisfy the validation threshold), then ML model testing system 102 may generate additional stateful ML models.

In some non-limiting embodiments, once the stateful ML model has been validated, ML model testing system 102 may further train the stateful ML model and/or create new stateful ML models based on receiving new training data. The new training data may include additional data associated with one or more transactions. In some non-limiting embodiments or aspects, the new training data may include data relating to a prediction that one or more transactions may be assigned to a category of transactions. For example, ML model testing system 102 may use the stateful ML model to predict that a transaction is to be assigned to a category of transactions and transmit the transaction to a user device (e.g., user device 106) that is associated with that category of transactions. In such an example, ML model testing system 102 may update one or more stateful ML models based on this new training data. In this way, ML model testing system 102 may generate, test, and validate a plurality of stateful ML models, thus, significantly reducing the amount of time and resources required to test and validate production ML models.

In some non-limiting embodiments or aspects, ML model testing system 102 may validate a plurality of scores generated based on the simulation of online activities. In some non-limiting embodiments or aspects, when validating the plurality of scores for the simulation of online activities, ML model testing system 102 may compare the plurality of scores for the simulation of online activities to a plurality of scores for the historical transaction data.

In some non-limiting embodiments or aspects, ML model testing system 102 may validate a response (e.g., a response associated with a data request action) generated by ML model testing system 102. In some non-limiting embodiments or aspects, ML model testing system 102 may validate the response by validating the response status code, the response header, and/or the response body. For example, ML model testing system 102 may validate a response by validating a response code, a REST response header, a REST response body, a gRPC response header, and/or a gRPC response body.

Referring now to FIGS. 4A-4E, FIGS. 4A-4E are diagrams of non-limiting embodiments or aspects of an implementation 400 of a process (e.g., process 300) for testing a ML model based on simulations in an offline environment using offline data. As shown in FIGS. 4A-4E, implementation 400 may include ML model testing system 102 performing the steps of the process.

Figure 4A:
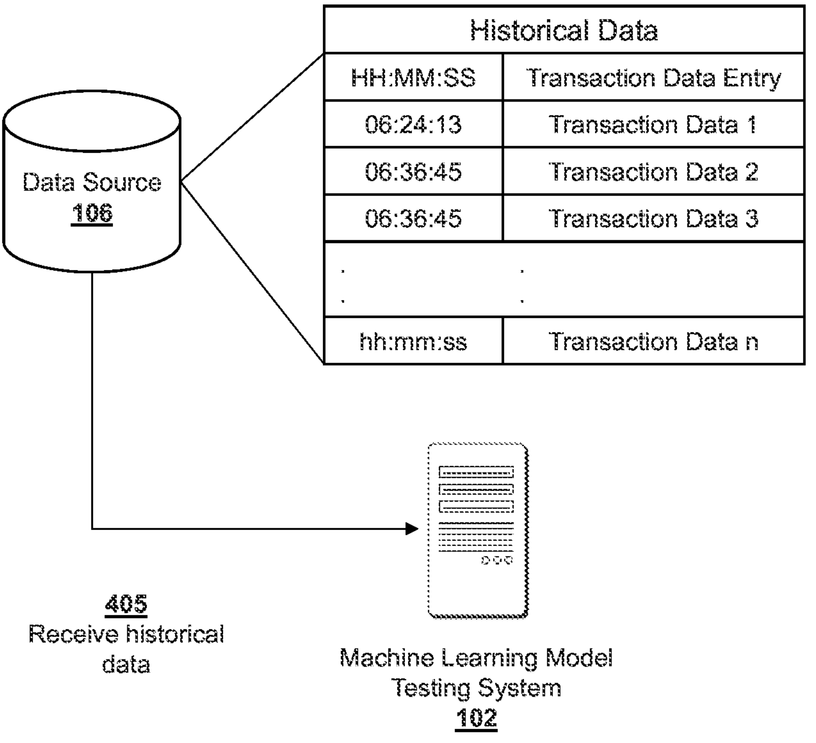
FIGS. 4A-4E are diagrams of non-limiting embodiments or aspects of an implementation of a process for testing the ML model based on simulations in an offline environment using offline data.

As shown by reference number 405 in FIG. 4A, ML model testing system 102 may receive historical data. For example, ML model testing system 102 may receive historical data from data source 108. In some non-limiting embodiments or aspects, the historical data may include a plurality of data records (e.g., data entries, transaction records, transaction data entries) of history payment transactions (e.g., historical transactions). In some non-limiting embodiments or aspects, each data record of the plurality of data records may include a historical timestamp. For example, each data record of the plurality of data records may include the historical timestamp representing a date and/or a time of day when the data record was recorded and/or when an event (e.g., a transaction) corresponding to the data record occurred. For example, as shown in FIG. 4A, a first data record (e.g., Transaction Data 1) may include a historical timestamp representing a date and a time of day (e.g., 06:24:13) when the data record was recorded and/or when the event (e.g., the transaction) corresponding to the data record occurred.

In some non-limiting embodiments or aspects, ML model testing system 102 may receive historical data for batch processing. For example, ML model testing system 102 may receive historical data (e.g., long-term historical data, long-term historical transaction data up to 90-days old, or collected within the previous 90 days from the day the data is received) from data source 108 for batch processing. In some non-limiting embodiments or aspects, ML model testing system 102 may process the historical data by processing all of the historical data received by ML model testing system 102 at one time (e.g., batch processing).

Figure 4B:
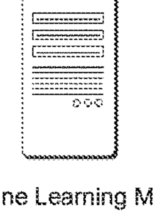

As shown by reference number 410 in FIG. 4B, ML model testing system 102 may generate simulation data. For example, ML model testing system 102 may generate online simulation data (e.g., simulation data that may be used in a simulation of online activities) including a plurality of simulation data records. In some non-limiting embodiments or aspects, ML model testing system 102 may generate simulation data by modifying the historical timestamp of each data record of the plurality of data records of the historical data to provide the simulation data. In some non-limiting embodiments or aspects, ML model testing system 102 may replace the historical timestamp of each data record with a relative timestamp. For example, ML model testing system 102 may modify the historical timestamp of each data record of the plurality of data records of the historical data by converting the historical timestamp to a relative timestamp (e.g., a timestamp relative to a historical timestamp that is selected as a starting time for the simulation data) and/or replacing the historical timestamp of each data record with the relative timestamp.

In some non-limiting embodiments or aspects, when modifying the historical timestamp of each data record, ML model testing system 102 may convert the historical timestamp of each data record of the plurality of data records to a relative timestamp of each simulation data record of a plurality of simulation data records. For example, ML model testing system 102 may convert the historical timestamp (e.g., 06:24:13 shown in FIG. 4B) of a first data record (e.g., Transaction Data 1) to a relative timestamp (e.g., 00:00:00 shown in FIG. 4B) of a first simulation data record of the simulation data. In some non-limiting embodiments or aspects, a relative timestamp may include a timestamp representing a date and/or a time of day relative to a first reference timestamp selected from the historical timestamps of each data record of the plurality of data records of the historical data. In the described example, the historical timestamp corresponding to the first data record of the historical data is selected as the first reference timestamp.

In some non-limiting embodiments or aspects, ML model testing system 102 may select a first reference timestamp from the timestamps of each data record of the plurality of data records of the historical data. In some non-limiting embodiments or aspects, ML model testing system 102 may modify the first reference timestamp to generate a first relative timestamp by converting the first reference timestamp to the first relative timestamp. In some non-limiting embodiments or aspects, the first relative timestamp may represent a time of zero (0) (e.g., a start time, an initial time, and/or the like). In some non-limiting embodiments or aspects, the first relative timestamp may correspond to the first simulation data record of the simulation data (e.g., the online simulation data).

In some non-limiting embodiments or aspects, ML model testing system 102 may sequence each simulation data record of the plurality of simulation data records. In some non-limiting embodiments or aspects, ML model testing system 102 may sequence each simulation data record of the plurality of simulation data records based on the relative timestamp of each simulation data record. For example, ML model testing system 102 may sequence each simulation data record of the plurality of simulation data in order from the earliest relative timestamp (e.g., 00:00:00) to the latest relative timestamp to provide sequenced simulation data. In this way, ML model testing system 102 may perform the simulation of online activities using the sequenced simulation data to simulate actual events (e.g., the sequence of actual events).

In some non-limiting embodiments or aspects, ML model testing system 102 may sequence each simulation data record of the plurality of simulation data records based on other factors (e.g., features of the data, identifiers of the data, and/or the like). For example, ML model testing system 102 may sequence each simulation data record of the plurality of simulation data records based on an issuer bank associated with each simulation data record of the plurality of simulation data records. In this way, ML model testing system 102 may process data (e.g., simulation data records) that originated based on a first issuer bank before processing data that originated from other issuer banks. In this case, ML model testing system 102 may sequence each simulation data record of the plurality of simulation data records independent of the relative timestamps of each simulation data record.

In some non-limiting embodiments or aspects, ML model testing system 102 may randomize the order of each simulation data record of the plurality of simulation data based on the relative timestamp of each simulation data record to provide random simulation data. In some non-limiting embodiments or aspects, ML model testing system 102 may perform the simulation of online activities using the random simulation data to simulate disturbance in actual events (e.g., data being out of order, abnormal data delay, and/or the like).

In some non-limiting embodiments or aspects, when generating the simulation data (e.g., the online simulation data), ML model testing system 102 may perform one or more data conversion operations on the historical transaction data. For example, ML model testing system 102 may perform a data conversion operation including transforming the historical transaction data into inference data (e.g., input data, inference transaction data, and/or the like) for use in a data insertion action and/or a data request action. In this way, ML model testing system 102 may transform the historical transaction data into data that has a configuration that is capable of being processed by ML model testing system 102 (e.g., the stateful ML model of ML model testing system 102).

In some non-limiting embodiments or aspects, ML model testing system 102 may perform one or more data conversion operations on one or more features included in the historical transaction data. For example, ML model testing system 102 may perform a data conversion operation on a name (e.g., a field name) of the one or more features of the historical transaction data. In some non-limiting embodiments or aspects, ML model testing system 102 may perform one or more data conversion operations on one or more data types of the one or more features included in the historical transaction data. For example, ML model testing system 102 may perform a data conversion operation on the one or more features of the historical transaction data to convert a data type of Boolean (e.g., true, false, and/or the like) to a data type of integer (e.g., 0, 1) of the one or more features of the historical transaction data. ML model testing system 102 may perform a data conversion operation on the one or more features of the historical transaction data to convert a data type of string (e.g., "1024") to a data type of integer (e.g., 1024). In this way, ML model testing system 102 may convert the data types of the historical transaction data into data that has a configuration that is capable of being processed by ML model testing system 102 (e.g., the stateful ML model of ML model testing system 102).

In some non-limiting embodiments or aspects, ML model testing system 102 may perform one or more data conversion operations on one or more numeric values of the one or more features included in the historical transaction data. For example, ML model testing system 102 may perform a data conversion operation on the one or more numeric values of the one or more features of the historical transaction data to convert a numeric value including a format of scientific notation (e.g., $2.5217\times10^3$) to a numeric value including a format of floating point notation (e.g., 2,521.7) of the one or more features of the historical transaction data. In some non-limiting embodiments or aspects, ML model testing system 102 may perform a data conversion operation on the one or more numeric values of the one or more features of the historical transaction data to round the numerical value to a nearest digit and/or truncate the numerical value. In this way, ML model testing system 102 may convert the historical transaction data into data that has a configuration that is capable of being processed by ML model testing system 102 (e.g., the stateful ML model of ML model testing system 102) and/or data that may improve performance (e.g., reduce execution time, improve accuracy, reduce a range of outputs for validation, and/or the like).

In some non-limiting embodiments or aspects, ML model testing system 102 may modify the historical timestamp of each data record of the plurality of data records of the historical data based on the first reference timestamp selected from the historical timestamps and based on the first relative timestamp of the first simulation data record of the simulation data. In some non-limiting embodiments or aspects, ML model testing system 102 may generate relative timestamps for simulation data records subsequent to the first simulation data record by modifying the timestamp of the data record of the historical data corresponding to the subsequent simulation data record based on the first relative timestamp of the simulation data records, the first reference timestamp selected from the historical timestamps, and the timestamp of the data record of the historical data corresponding to the subsequent simulation data record. For example, as shown in FIG. 4B, ML model testing system 102 may generate a relative timestamp of the second simulation data record of the simulation data by modifying the timestamp of the second data record of the historical data (e.g., the data record of the historical data corresponding to the subsequent, in this example second, simulation data record) based on the first relative timestamp of the simulation data records (e.g., 00:00:00 as shown in FIG. 4B), the first reference timestamp selected from the historical timestamps (e.g., 06:24:13 as shown in FIG. 4B), and the timestamp of the second data record (e.g., 06:36:45 as shown in FIG. 4B).

In some non-limiting embodiments or aspects, ML model testing system 102 may generate relative timestamps for simulation data records subsequent to the first simulation data record by determining a difference of time between the timestamp of the data record of the historical data corresponding to the subsequent simulation data record and the first reference timestamp selected from the historical timestamps. For example, as shown in FIG. 4B, ML model testing system 102 may generate a relative timestamp of the third simulation data record (e.g., 02:57:54 as shown in FIG. 4B) by determining a difference of time between the timestamp of the third data record of the historical data (e.g., 09:22:07 as shown in FIG. 4B) and the first reference timestamp selected from the historical timestamps (e.g., 06:24:13 as shown in FIG. 4B).

Figure 4C:
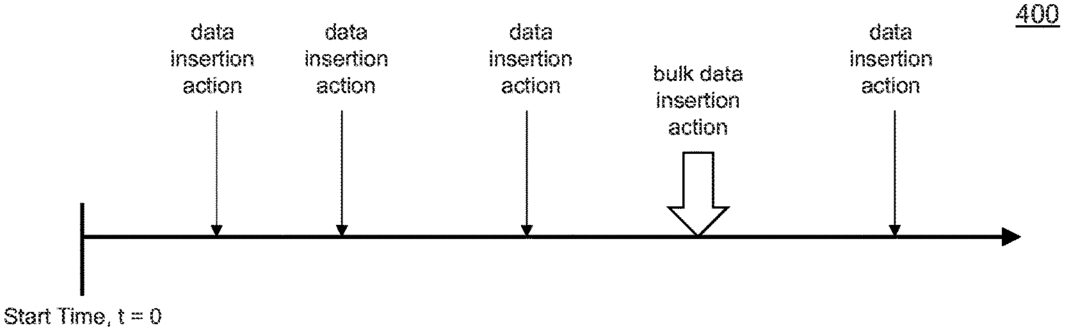
Figure 4C:
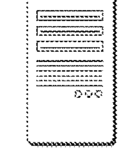
Figure 4C:
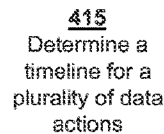

As shown by reference number 415 in FIG. 4C, ML model testing system 102 may determine a timeline for a plurality of data actions. For example, ML model testing system 102 may determine a timeline for a plurality of data insertion actions and a plurality of data request actions based on the simulation data. In some non-limiting embodiments or aspects, the timeline may include a start time associated with the first relative timestamp. For example, ML model testing system 102 may determine the timeline for the plurality of data actions based on the timeline having a start time associated with the first relative timestamp representing a time of zero (0).

In some non-limiting embodiments or aspects, ML model testing system 102 may determine the timeline for the plurality of data insertion actions and the plurality of data request actions based on arranging (e.g., orchestrating) the plurality of data insertion actions and the plurality of data request actions in the timeline and selecting the data sources of the plurality of data insertion actions and the plurality of data request actions, such that the timeline may represent a real-time flow of data that may be seen in a production ML model and/or a production ML system. In some non-limiting embodiments or aspects, ML model testing system 102 may arrange the plurality of data insertion actions and the plurality of data request actions using a simulation tool and/or a stateful computation application (e.g., Apache™, Flink®, and/or the like). In this way, ML model testing system 102 may determine a timeline that may closely match and/or simulate an actual production environment and/or an actual production ML model and system.

In some non-limiting embodiments or aspects, ML model testing system 102 may assign a timestamp to each data insertion action of the plurality of data insertion actions and each data request action of the plurality of data request actions, such that each data insertion action of the plurality of data insertion actions and each data request action of the plurality of data request actions correspond to a point (e.g., location, time value) along the timeline. For example, ML model testing system 102 may determine a timeline for a plurality of data insertion actions and a plurality of data request actions based on assigning a timestamp to each data insertion action of the plurality of data insertion actions and each data request action of the plurality of data request actions.

In some non-limiting embodiments or aspects, ML model testing system 102 may determine the timeline for the plurality of data insertion actions and the plurality of data request actions based on assigning a timestamp that is associated with one or more criteria. For example, ML model testing system 102 may determine the timeline for the plurality of data insertion actions and the plurality of data request actions based on assigning a timestamp that is associated with a certain time of day (e.g., a timestamp of 05:00:00 for each day along a timeline). In some non-limiting embodiments or aspects, ML model testing system 102 may assign one or more timestamps that are associated with a random amount of time (e.g., a time interval) between each timestamp. For example, ML model testing system 102 may assign one or more timestamps to the plurality of data insertion actions and the plurality of data request actions having a random amount of time between the timestamp for each data insertion action of the plurality of data insertion actions and/or each data request action of the plurality of data request actions.

In some non-limiting embodiments or aspects, ML model testing system 102 may assign a timestamp to each data insertion action of the plurality of data insertion actions where the timestamp corresponds to a transaction (e.g., a data insertion action inserting transaction data and/or transaction features). For example, ML model testing system 102 may assign a timestamp to each data insertion action of the plurality of data insertion actions where each timestamp and each data insertion action corresponds to a transaction (e.g., the occurrence of a transaction, the insertion of transaction data) along the timeline (e.g., the timeline determined by ML model testing system 102).

Figure 4D:
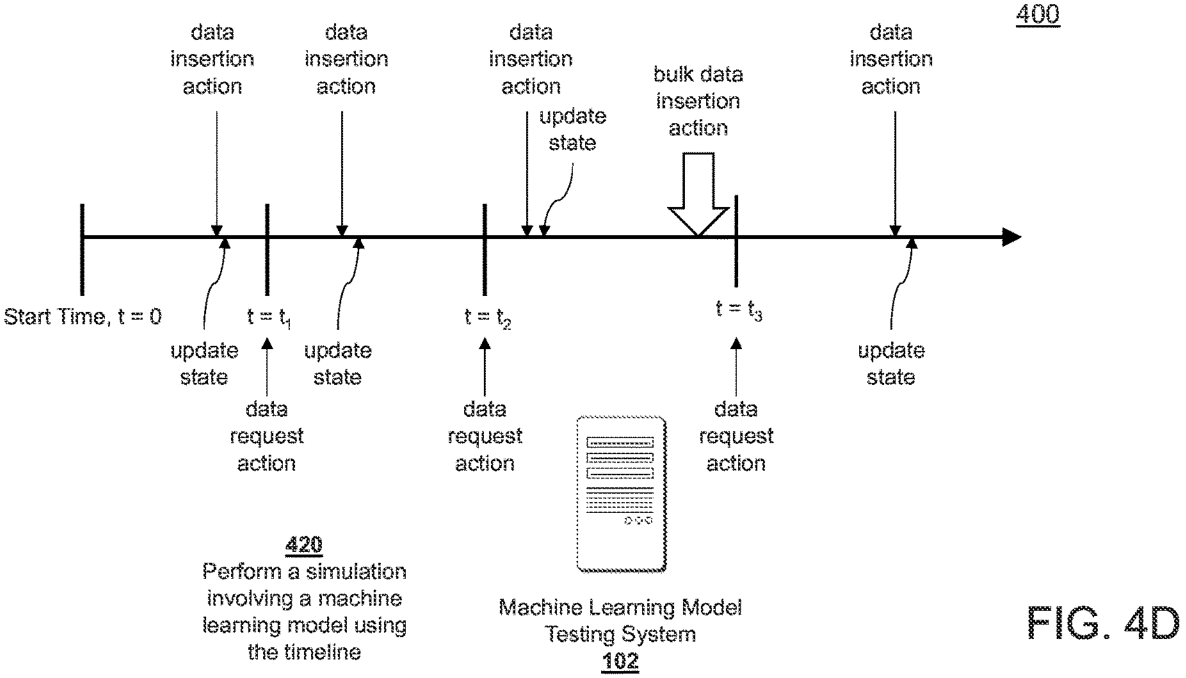

As shown by reference number 420 in FIG. 4D, ML model testing system 102 may perform a simulation involving the ML model using the timeline. For example, ML model testing system 102 may perform a simulation of online activities involving the stateful ML model using the timeline for the plurality of data insertion actions and the plurality of data request actions. In some non-limiting embodiments or aspects, ML model testing system 102 may perform the simulation of online activities involving the stateful ML model using the timeline for the plurality of data insertion actions and the plurality of data request actions by beginning execution of the simulation of online activities at a time equal to a start time (e.g., a time equal to 0). For example, ML model testing system 102 may perform the simulation of online activities by beginning execution of the simulation of online activities at a start time equal to 0 (e.g., 00:00:00 of the relative timestamps). ML model testing system 102 may perform the simulation of online activities by continually (e.g. repeatedly) executing one or more instructions using a processor for each time step of a plurality of time steps. In some non-limiting embodiments or aspects, a time step (e.g., simulation frame, simulation tick, and/or the like) may include any amount of time, such that the simulation of online activities may achieve a desired frequency. For example, if the simulation of online activities should execute at 20 Hertz, then the time step may include 0.05 seconds.

In some non-limiting embodiments or aspects, ML model testing system 102 may perform the simulation of online activities by continually executing the one or more instructions using a processor for each time step of the plurality of time steps based on the timeline for the plurality of data insertion actions and the plurality of data request actions. For example, ML model testing system 102 may continually execute the one or more instructions using a processor for each time step of the plurality of time steps to generate a time value (e.g., simulation time value, simulation clock, and/or the like). In some non-limiting embodiments or aspects, the time value may be generated based on a clock associated with a computing device that may be a component of ML model testing system 102, a clock associated with ML model testing system 102, and/or based on continually executing the one or more instructions using a processor for each time step of the plurality of time steps. For example, ML model testing system 102 may generate the time value based on a duration of time that ML model testing system 102 has continually executed the one or more instructions of the online simulation. ML model testing system 102 may continually execute the one or more instructions of the online simulation for 4 minutes and 30 seconds (e.g., at a time step of 0.05, a total of 5,400 time steps), the time value may be equal to 00:04:30.

In some non-limiting embodiments or aspects, ML model testing system 102 may perform the simulation of online activities by performing read operations (e.g., reading data from storage, memory, and/or the like) and/or by performing writing operations (e.g., writing data to storage, memory, and/or the like). In some non-limiting embodiments or aspects, ML model testing system 102 may perform read operations and/or write operations by reading and/or writing data to a data storage device and/or a software and/or a hardware storage component (e.g., database). For example, ML model testing system 102 may perform read operations and/or write operations using an in-memory data storage component and/or an in-memory data storage application (e.g., Redis®).

In some non-limiting embodiments or aspects, ML model testing system 102 may initialize an in-memory storage component and/or an in-memory data storage application locally (e.g., on a local computing device) before performing read operations and/or write operations to perform the simulation of online activities. In this way, ML model testing system 102 may use an in-memory data storage component and/or an in-memory data storage application that has a clean state at the start of a simulation of online activities. Using a clean state of an in-memory data storage component and/or an in-memory data storage application may allow ML model testing system 102 to perform a plurality of simulations of online activities, each simulation of online activities using a clean state of an in-memory data storage component and/or an in-memory data storage application.

In some non-limiting embodiments or aspects, ML model testing system 102 may perform the simulation of online activities by continually executing the one or more instructions using a processor for each time step of the plurality of time steps until an end of the timeline is reached. In some non-limiting embodiments or aspects, ML model testing system 102 may terminate (e.g., terminate execution, complete execution, and/or the like) the simulation of online activities at any time (e.g., timestamp) along the timeline.

In some non-limiting embodiments or aspects, when performing the simulation of online activities involving the stateful ML model, ML model testing system 102 may update (e.g., generate an update request action) a state of the stateful ML model after each data insertion action of the plurality of data insertion actions within the timeline during the simulation of online activities. In some non-limiting embodiments or aspects, ML model testing system 102 may update a state of the stateful ML model after each data request action of the plurality of data request actions during the simulation of online activities. In some non-limiting embodiments or aspects, ML model testing system 102 may update a state of the stateful ML model based on one or more data request actions received as a result of Stand-In Processing (STIP).

In some non-limiting embodiments or aspects, the stateful ML model may refer to an ML model that may update and/or maintain a state of the layers and/or weights of the ML model for each batch of training data (e.g., each training dataset) that the ML model processes during training. For example, the stateful ML model may receive a first training dataset as input for training. The stateful ML model may process the first training dataset, and the stateful ML model may update the layers and/or weights of the stateful ML model accordingly when processing the first training dataset to provide the stateful ML model having a first state. The stateful ML model may then receive a second training dataset as input for training. The stateful ML model may process the second training dataset, and the stateful ML model may update the layers and/or weights of the stateful ML model accordingly when processing the second training dataset to provide the stateful ML model having a first state and a second state. In some non-limiting embodiments or aspects, each state associated with the stateful ML model (e.g., the first state, the second state, the third state, etc.) may be stored in a storage component, such that the state may be loaded by a processor and applied to the stateful ML model. In some non-limiting embodiments or aspects, the stateful ML model may refer to the ML model that may be updated over time when the ML model is provided with training data (e.g., as inputs) over time. In some instances, the stateful ML model may refer to the ML model that is dependent on historical data (e.g., historical data that has been seen by the model and/or that has been input to the model) to learn and/or generate inferences.

In some non-limiting embodiments or aspects, the stateful ML model may refer to the ML model that may be updated over time when the ML model is provided with testing data (e.g., as inputs) over time. In some non-limiting embodiments or aspects, the stateful ML model may refer to the ML model that may be updated over time when the ML model is provided with production (e.g., inference) data (e.g., as inputs) over time for generating predictions and/or inferences.

In some non-limiting embodiments or aspects, when ML model testing system 102 assigns the timestamp to a data insertion action, ML model testing system 102 may assign a time delay (e.g., an amount of time after the data insertion action) to the data insertion action. In some non-limiting embodiments or aspects, the time delay assigned to the data insertion action may represent (e.g., account for) the time required to execute the stateful ML model after the data insertion action is executed (e.g., after the data insertion action is triggered, while ML model testing system 102 performs the simulation involving the stateful ML model).

In some non-limiting embodiments or aspects, ML model testing system 102 may assign a time delay to each data insertion action of the plurality of data insertion actions based on the data source (e.g., data source 108) that transmitted the historical data (e.g., historical transaction data) associated with the data insertion action. For example, ML model testing system 102 may assign a first time delay to a data insertion action associated with historical data transmitted from a first data source, and ML model testing system 102 may assign a second time delay to a data insertion action associated with historical data transmitted from a second data source.

In some non-limiting embodiments or aspects, a data insertion action may include an action where ML model testing system 102 receives data (e.g., historical data, online simulation data, and/or the like) for the ML model (e.g., a stateful ML model, an ML model system). For example, a data insertion action may include ML model testing system 102 (e.g., the stateful ML model of ML model testing system 102) receiving transaction data associated with one or more features of the historical data and/or the online simulation. In some non-limiting embodiments or aspects, the data received by ML model testing system 102 and/or the stateful ML model based on the data insertion action may include data (e.g., a training dataset) used for training the stateful ML model.

In some non-limiting embodiments or aspects, a data insertion action may include an action where ML model testing system 102 receives a large amount of data (e.g., a bulk data insertion action) for the ML model. For example, a data insertion action may include ML model testing system 102 receiving a large amount of transaction data associated with a plurality of features of the historical data and/or the online simulation. In some non-limiting embodiments or aspects, a bulk insertion may represent a situation where a data source collects data in bulk (e.g., transaction data associated with a plurality of transactions). For example, a data source (e.g., an issuer system, a merchant system, and/or the like) may collect data in bulk before transmitting the data to another system (e.g., a transaction service provider system), and the data source may transmit the data in bulk to another system (e.g., a system executing the ML model) at a later time after a plurality of transactions have been collected. In this way, ML model testing system 102 may simulate bulk data insertion actions to a receiving system executing the ML model (e.g., a production ML model).

In some non-limiting embodiments or aspects, ML model testing system 102 may trigger a data insertion action based on the timestamp assigned to the data insertion action, while performing the simulation of online activities. For example, ML model testing system 102 may trigger a data insertion action associated with a transaction (e.g., the occurrence of a transaction, insertion of transaction data, insertion of features associated with a transaction and/or transaction data, and/or the like) based on the timestamp assigned to the data insertion action, while performing the simulation of online activities.

In some non-limiting embodiments or aspects, ML model testing system 102 may trigger a data insertion action associated with generating features based on the timestamp assigned to the data insertion action, while performing the simulation of online activities. For example, ML model testing system 102 may trigger a data insertion action associated with generating features (e.g., features of a transaction, features associated with transaction data, and/or the like) based on the timestamp assigned to the data insertion action at a predetermined time of day, while performing the simulation of online activities.

In some non-limiting embodiments or aspects, ML model testing system 102 may trigger a data insertion action based on the timestamp assigned to the data insertion action and a delay time assigned to the data insertion action. For example, when performing the simulation of online activities, ML model testing system 102 may trigger the data insertion action when the time value (e.g., simulation clock) is equal to the timestamp assigned to the data insertion action.

In some non-limiting embodiments or aspects, a data request action may include an action where ML model testing system 102 receives a request (e.g., requesting, performing a request, and/or the like) for the ML model (e.g., a stateful ML model, an ML model system) where the request may include a request for an inference from the ML model. For example, a data request action may include transmitting a request to the stateful ML model where the request includes a request for an inference based on a transaction (e.g., transaction data). The inference may include a prediction, a confidence score, and/or the like where the inference provides information and/or results associated with the transaction (e.g., whether the transaction was fraudulent, and/or the like). In some non-limiting embodiments or aspects, the request received by ML model testing system 102 may include the online simulation data.

In some non-limiting embodiments or aspects, ML model testing system 102 may trigger a data request action (e.g., while ML model testing system 102 performs a simulation of online activities) associated with a request for an inference from the ML model (e.g., the stateful ML model). In some non-limiting embodiments or aspects, ML model testing system 102 may trigger the data request action based on the timeline for the plurality of data insertion actions and the plurality of data request actions. For example, ML model testing system 102 may trigger the data request action based on the timestamp assigned to the data request action within the timeline for the plurality of data insertion actions and the plurality of data request actions. In some non-limiting embodiments or aspects, when performing the simulation of online activities, ML model testing system 102 may trigger the data request action when the time value (e.g., simulation clock) is equal to the timestamp assigned to the data request action.

In some non-limiting embodiments or aspects, when ML model testing system 102 triggers a data request action, ML model testing system 102 may generate features based on the historical data, the online simulation data, and/or the stateful ML model (e.g., the state of the stateful ML model at the time the data request action is triggered within the timeline of the plurality of data insertion actions and the plurality of data request actions). In some non-limiting embodiments or aspects, when ML model testing system 102 triggers a data request action, ML model testing system 102 may generate scores based on the historical data, the online simulation data, and/or the stateful ML model.

In some non-limiting embodiments or aspects, when ML model testing system 102 triggers a data request action, ML model testing system 102 may pause execution (e.g., not execute) of data insertion actions during the simulation of online activities. For example, ML model testing system 102 may not execute any data insertion actions simultaneously with the triggering and/or execution of a data request action, and ML model testing system 102 may not execute any data insertion actions during any delay time assigned to the data request action that has been triggered and/or executed. In this way, ML model testing system 102 may execute data request actions to serve as a pause (e.g., breakpoint) on the execution of data insertion actions. In some non-limiting embodiments or aspects, ML model testing system 102 may terminate the simulation of online activities at any time along the timeline and/or after ML model testing system 102 has triggered each of the data insertion actions of the plurality of insertion actions and/or each data request action of the plurality of data request actions.

In some non-limiting embodiments or aspects, ML model testing system 102 may generate a response (e.g., a response associated with a data request action) based on triggering a data request action and/or an update request action (e.g., an action requesting an update to a state of the stateful ML model). In some non-limiting embodiments or aspects, the response may include a response status code, a response header, and/or a response body. In some non-limiting embodiments or aspects, the data request action and/or the response may be based on a request associated with a Representation State Transfer (REST) application programming interface (API) call. For example, ML model testing system 102 may trigger a data request action by generating and/or executing the REST API call to process transaction data, and ML model testing system 102 may generate the REST API response based on the REST API call and/or data request action. In some non-limiting embodiments or aspects, the data request action, update request, and/or the response may be based on a request associated with a remote procedure call (e.g., a remote procedure call, such as gRPC). For example, ML model testing system 102 may trigger an update (e.g., update request action) to update a state of the stateful ML model by generating and/or executing the gRPC remote procedure call.

In some non-limiting embodiments or aspects, ML model testing system 102 may update (e.g., generate an update request action, build, etc.) a state of the stateful ML model based on the historical data (e.g., based on receiving the historical data as input to the stateful ML model for training) and/or based on real-time data (e.g., based on receiving real-time data as input to the stateful ML model during training and/or during a simulation of online activities, for example receiving input as a data request action).

In some non-limiting embodiments or aspects, when performing the simulation of online activities involving the stateful ML model, ML model testing system 102 may perform a feature engineering procedure based on the online simulation data (e.g., the online simulation data included in the plurality of data insertion actions and/or the plurality of data request actions) to provide a plurality of features for the simulation of online activities. In some non-limiting embodiments or aspects, when performing the simulation of online activities involving the stateful ML model, ML model testing system 102 may validate the plurality of features for the simulation of online activities based on the historical transaction data.

In some non-limiting embodiments or aspects, ML model testing system 102 may perform a feature engineering procedure based on the historical data to provide a plurality of features for the historical data (e.g., historical transaction data). For example, ML model testing system 102 may generate features based on the historical data. In some non-limiting embodiments or aspects, ML model testing system 102 may generate features using a feature engineering pipeline (e.g., an automated process to generate features involving extracting, cleaning, manipulating, and/or encoding raw data). In some non-limiting embodiments or aspects, ML model testing system 102 may perform a feature engineering procedure using one or more software applications and/or software tools (e.g., Apache™, Flink®, Apache™, Spark™, and/or the like). In this way, ML model testing system 102 may perform feature engineering procedures automatically and without user input (e.g., in an automated way).

In some non-limiting embodiments or aspects, a feature engineering procedure may refer to a process for transforming raw data (e.g., historical data) into features and/or feature values, such that the ML model receiving the historical data as input is capable of interpreting the historical data. For example, a feature engineering procedure may include concatenating two or more fields (e.g., data fields) of the historical data (e.g., the raw historical data) to form a new field. Another example of a feature engineering procedure may include calculating a value of a new field based on values of two or more fields of the historical data. In this way, ML model testing system 102 may perform a feature engineering procedure by generating a new feature (e.g., a new data field), for example, using historical transaction data, by subtracting a first transaction time for a later transaction made by a first account from a second transaction time for an earlier transaction made by the first account to generate an amount of time since the first account was last used in a transaction.

In some non-limiting embodiments or aspects, ML model testing system 102 may perform the simulation of online activities based on a data stream (e.g., a sequence of data representing events). In some non-limiting embodiments or aspects, ML model testing system 102 may perform the simulation of online activities to generate runtime data (e.g., runtime output). For example, ML model testing system 102 may generate runtime data based on ML model testing system 102 performing the simulation of online activities, and ML model testing system 102 may transmit the runtime data to a stateful computation application and/or a stateful computation tool (e.g., a simulation tool, Apache™, Flink®, and/or the like).

In some non-limiting embodiments or aspects, ML model testing system 102 may generate a plurality of features and/or a plurality of scores based on the simulation of online activities. For example, ML model testing system 102 may generate a plurality of features based on a feature engineering procedure performed while ML model testing system 102 performs the simulation of online activities. In some non-limiting embodiments or aspects, ML model testing system 102 may generate a plurality of scores (e.g., a plurality of confidence scores, inference predictions, and/or the like). For example, ML model testing system 102 may generate a plurality of scores based on triggering a plurality of data request actions, while ML model testing system 102 performs the simulation of online activities.

Figure 4E:
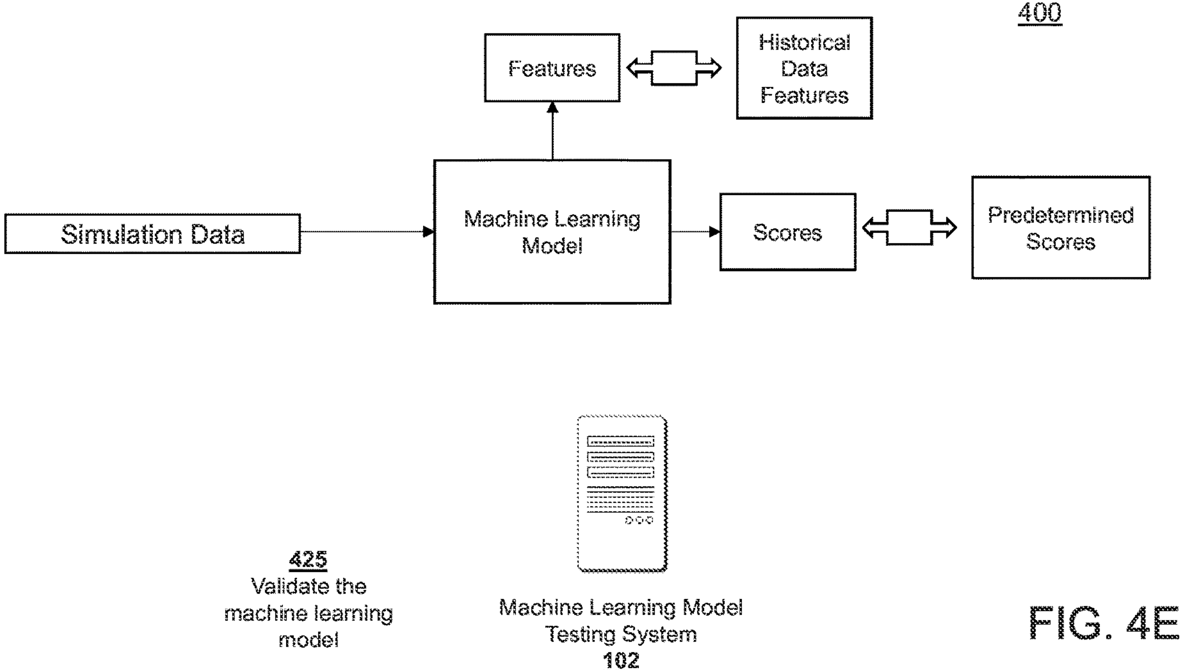

As shown by reference number 425 in FIG. 4E, ML model testing system 102 may validate the machine learning model. For example, ML model testing system 102 may validate the stateful ML based on the simulation of online activities. In some non-limiting embodiments or aspects, ML model testing system 102 may validate a plurality of features (e.g., the features generated via a feature engineering procedure, a feature engineering pipeline, and/or the like) generated based on the simulation of online activities. In some non-limiting embodiments or aspects, when validating the plurality of features for the simulation of online activities, ML model testing system 102 may compare the plurality of features for the simulation of online activities to the plurality of features for the historical transaction data.

In some non-limiting embodiments or aspects, ML model testing system 102 may validate a plurality of scores generated based on the simulation of online activities. In some non-limiting embodiments or aspects, when validating the plurality of scores for the simulation of online activities, ML model testing system 102 may compare the plurality of scores for the simulation of online activities to a plurality of scores for the historical transaction data.

In some non-limiting embodiments or aspects, ML model testing system 102 may validate a response (e.g., a response associated with a data request action) generated by ML model testing system 102. In some non-limiting embodiments or aspects, ML model testing system 102 may validate the response by validating the response status code, the response header, and/or the response body. For example, ML model testing system 102 may validate a response by validating a response code, a REST response header, a REST response body, a gRPC response header, and/or a gRPC response body.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising at least one processor programmed or configured to:

receive historical transaction data, wherein the historical transaction data comprises a plurality of data records of history payment transactions, wherein each data record has a historical timestamp;

generate online simulation data based on the historical transaction data, wherein, when generating the online simulation data, the at least one processor is programmed or configured to:

modify the historical timestamp of each data record to provide the online simulation data, wherein when modifying the historical timestamp of each data record to provide the online simulation data, the at least one processor is programmed or configured to:

assign a timestamp to each data insertion action of a plurality of data insertion actions where the timestamp corresponds to a time of a simulated payment transaction of a plurality of simulated payment transactions;

determine a timeline for the plurality of data insertion actions and a plurality of data request actions based on the online simulation data, wherein the timeline represents a simulation of a real-time flow of data that is seen in a production environment, wherein the plurality of data request actions comprises a plurality of requests for an inference from a stateful machine learning (ML) model, and wherein, when determining the timeline for the plurality of data insertion actions and the plurality of data request actions, the at least one processor is programmed or configured to:

orchestrate the plurality of data insertion actions and the plurality of data request actions in the timeline; and select data sources of the plurality of data insertion actions and the plurality of data request actions;

perform a simulation of online activities involving the stateful ML model in an offline environment using the timeline for the plurality of data insertion actions and the plurality of data request actions, wherein the stateful ML model is configured to provide an output, in response to an input that comprises a simulated payment transaction, that includes a prediction of a category of a plurality of categories of transactions to which the simulated payment transaction is assigned, and wherein, when performing the simulation of online activities involving the stateful ML model in the offline environment using the timeline for the plurality of data insertion actions and the plurality of data request actions, the at least one processor is programmed or configured to:

begin the simulation of online activities at a time equal to a start time of the timeline;

execute one or more instructions for each time step of a plurality of time steps based on the timeline; and update a state of the stateful ML model after each data request action of the plurality of data request actions during the simulation of online activities; and validate the stateful ML model based on the simulation of online activities.

2. The system of claim 1, wherein, when performing the simulation of online activities involving the stateful ML model, the at least one processor is programmed or configured to:

perform a feature engineering procedure based on the online simulation data to provide a plurality of features for the simulation of online activities; and validate the plurality of features for the simulation of online activities based on the historical transaction data.

3. The system of claim 1, wherein the at least one processor is further programmed or configured to:

perform a feature engineering procedure based on the historical transaction data to provide a plurality of features for the historical transaction data; and wherein, when validating the plurality of features for the simulation of online activities, the at least one processor is programmed or configured to:

compare the plurality of features for the simulation of online activities to the plurality of features for the historical transaction data.

4. The system of claim 1, wherein, when generating the online simulation data, the at least one processor is programmed or configured to:

perform one or more data conversion operations on the historical transaction data.

5. The system of claim 1, wherein, when modifying the historical timestamp of each data record, the at least one processor is programmed or configured to:

replace the historical timestamp of each data record with a relative timestamp.

6. The system of claim 1, wherein, when performing the simulation of online activities involving the stateful ML model, the at least one processor is programmed or configured to:

generate a simulation score of the stateful ML model based on the online simulation data; and wherein, when validating the stateful ML model, the at least one processor is programmed or configured to:

compare the simulation score of the stateful ML model to a predetermined score.

7. A computer-implemented method comprising:

receiving, with at least one processor, historical transaction data, wherein the historical transaction data comprises a plurality of data records of history payment transactions, wherein each data record has a historical timestamp;

generating, with at least one processor, online simulation data based on the historical transaction data, wherein generating the online simulation data comprises:

modifying the historical timestamp of each data record to provide the online simulation data, wherein modifying the historical timestamp of each data record to provide the online simulation data comprises:

assigning a timestamp to each data insertion action of a plurality of data insertion actions where the timestamp corresponds to a time of a simulated payment transaction of a plurality of simulated payment transactions;

determining, with at least one processor, a timeline for the plurality of data insertion actions and a plurality of data request actions based on the online simulation data, wherein the timeline represents a simulation of a real-time flow of data that is seen in a production environment, wherein the plurality of data request actions comprises a plurality of requests for an inference from a stateful machine learning (ML) model, and wherein determining the timeline for the plurality of data insertion actions and the plurality of data request actions comprises:

orchestrating the plurality of data insertion actions and the plurality of data request actions in the timeline; and selecting data sources of the plurality of data insertion actions and the plurality of data request actions;

performing, with at least one processor, a simulation of online activities involving the stateful ML model using the timeline for the plurality of data insertion actions and the plurality of data request actions, wherein the stateful ML model is configured to provide an output, in response to an input that comprises a simulated payment transaction, that includes a prediction of a category of a plurality of categories of transactions to which the simulated payment transaction is assigned, and wherein performing the simulation of online activities involving the stateful ML model in the offline environment using the timeline for the plurality of data insertion actions and the plurality of data request actions comprises:

beginning the simulation of online activities at a time equal to a start time of the timeline;

executing one or more instructions for each time step of a plurality of time steps based on the timeline; and updating a state of the stateful ML model after each data request action of the plurality of data request actions during the simulation of online activities; and validating, with at least one processor, the stateful ML model based on the simulation of online activities.

8. The computer-implemented method of claim 7, wherein performing the simulation of online activities involving the stateful ML model comprises:

performing a feature engineering procedure based on the online simulation data to provide a plurality of features for the simulation of online activities; and validating the plurality of features for the simulation of online activities based on the historical transaction data.

9. The computer-implemented method of claim 7, further comprising:

performing a feature engineering procedure based on the historical transaction data to provide a plurality of features for the historical transaction data, wherein validating the plurality of features for the simulation of online activities comprises:

comparing the plurality of features for the simulation of online activities to the plurality of features for the historical transaction data.

10. The computer-implemented method of claim 7, wherein generating the online simulation data comprises:

performing one or more data conversion operations on the historical transaction data.

11. The computer-implemented method of claim 7, wherein modifying the historical timestamp of each data record comprises:

replacing the historical timestamp of each data record with a relative timestamp.

12. The computer-implemented method of claim 7, wherein performing the simulation of online activities involving the stateful ML model comprises:

generating a simulation score of the stateful ML model based on the online simulation data; and wherein validating the stateful ML model comprises:

comparing the simulation score of the stateful ML model to a predetermined score.

13. A computer program product comprising at least one non-transitory computer-readable medium including one or more instructions that, when executed by at least one processor, cause the at least one processor to:

receive historical transaction data, wherein the historical transaction data comprises a plurality of data records of history payment transactions, wherein each data record has a historical timestamp;

generate online simulation data based on the historical transaction data, wherein the one or more instructions that cause the at least one processor to generate the online simulation data, cause the at least one processor to:

modify the historical timestamp of each data record to provide the online simulation data, wherein, the one or more instructions that cause the at least one processor to modify the historical timestamp of each data record to provide the online simulation data, cause the at least one processor to:

assign a timestamp to each data insertion action of a plurality of data insertion actions where the timestamp corresponds to a time of a simulated payment transaction of a plurality of simulated payment transactions;

determine a timeline for the plurality of data insertion actions and a plurality of data request actions based on the online simulation data, wherein the timeline represents a simulation of a real-time flow of data that is seen in production environment, wherein the plurality of data request actions comprises a plurality of requests for an inference from a stateful machine learning (ML) model, and wherein, the one or more instructions that cause the at least one processor to determine the timeline for the plurality of data insertion actions and the plurality of data request actions, cause the at least one processor to:

orchestrate the plurality of data insertion actions and the plurality of data request actions in the timeline; and select the data sources of the plurality of data insertion actions and the plurality of data request actions;

perform a simulation of online activities involving the stateful ML model in an offline environment using the timeline for the plurality of data insertion actions and the plurality of data request actions, wherein the stateful ML model is configured to provide an output, in response to an input that comprises a simulated payment transaction, that includes a prediction of a category of a plurality of categories of transactions to which the simulated payment transaction is assigned, and wherein, the one or more instructions that cause the at least one processor to perform the simulation of online activities involving the stateful ML model in the offline environment using the timeline for the plurality of data insertion actions and the plurality of data request actions, cause the at least one processor to:

begin the simulation of online activities at a time equal to a start time of the timeline;

continually executing one or more instructions for each time step of a plurality of time steps based on the timeline; and update a state of the stateful ML model after each data request action of the plurality of data request actions during the simulation of online activities; and validate the stateful ML model based on the simulation of online activities.

14. The computer program product of claim 13, wherein the one or more instructions that cause the at least one processor to perform the simulation of online activities involving the stateful ML model, cause the at least one processor to:

perform a feature engineering procedure based on the online simulation data to provide a plurality of features for the simulation of online activities; and validate the plurality of features for the simulation of online activities based on the historical transaction data.

15. The computer program product of claim 13, wherein the one or more instructions that cause the at least one processor to generate the online simulation data, cause the at least one processor to:

perform one or more data conversion operations on the historical transaction data.

16. The computer program product of claim 13, wherein the one or more instructions that cause the at least one processor to modify the historical timestamp of each data record, cause the at least one processor to:

replace the historical timestamp of each data record with a relative timestamp.

17. The computer program product of claim 13, wherein the one or more instructions that cause the at least one processor to perform the simulation of online activities involving the stateful ML model, cause the at least one processor to:

generate a simulation score of the stateful ML model based on the online simulation data; and wherein the one or more instructions that cause the at least one processor to validate the stateful ML model, cause the at least one processor to:

compare the simulation score of the stateful ML model to a predetermined score.

* * * * *